US010143205B2

(12) United States Patent
Buller-Colthurst

(10) Patent No.: US 10,143,205 B2
(45) Date of Patent: Dec. 4, 2018

(54) AIR STREAM MANIPULATION WITHIN A THERMAL PROCESSING OVEN

(71) Applicant: Guy E. Buller-Colthurst, Grand Haven, MI (US)

(72) Inventor: Guy E. Buller-Colthurst, Grand Haven, MI (US)

( * ) Notice: Subject to any disclaimer, the term of this patent is extended or adjusted under 35 U.S.C. 154(b) by 394 days.

(21) Appl. No.: 14/994,327

(22) Filed: Jan. 13, 2016

(65) Prior Publication Data
US 2016/0215989 A1    Jul. 28, 2016

Related U.S. Application Data

(60) Provisional application No. 62/125,650, filed on Jan. 26, 2015.

(51) Int. Cl.
*F24C 15/32*    (2006.01)
*A21B 1/26*    (2006.01)

(52) U.S. Cl.
CPC ..................... *A21B 1/26* (2013.01)

(58) Field of Classification Search
CPC .......... F24C 15/322; A47J 27/18; A47J 37/00; A47J 37/0641; A47J 37/075
USPC ........... 99/330; 236/16, 15 A, 15 BR, 15 BD
See application file for complete search history.

(56) References Cited

U.S. PATENT DOCUMENTS

| 2,625,095 | A |   | 1/1953 | Julian |   |
|---|---|---|---|---|---|
| 2,764,354 | A | * | 9/1956 | Peterson | F24F 3/0522 236/13 |
| 3,941,533 | A | * | 3/1976 | Gillespie | B05C 19/00 236/16 |
| 4,250,917 | A |   | 2/1981 | Jespersen et al. |   |
| 4,327,279 | A | * | 4/1982 | Guibert | A23L 3/365 126/110 A |
| 4,603,491 | A |   | 8/1986 | Hengle et al. |   |
| 4,752,268 | A | * | 6/1988 | Kataoka | C03B 25/06 219/400 |
| 5,401,940 | A | * | 3/1995 | Smith | A21B 1/245 219/679 |

(Continued)

OTHER PUBLICATIONS

U.S. Appl. No. 60/939,002, filed May 18, 2007, Maki.
U.S. Appl. No. 60/892,225, filed Feb. 28, 2007, Maki.
U.S. Appl. No. 12/036,636, filed Aug. 28, 2008, Maki.

*Primary Examiner* — Jimmy Chou
(74) *Attorney, Agent, or Firm* — Hultman Law, PLC; Eric Andrew Hultman, Esq.

(57) ABSTRACT

The invention disclosed herein relates to methods for controlling pressurized air streams within a food-processing oven. In this invention, two or more pressurized air streams are caused to collide creating a turbulent airflow in a third and separate direction. One or more dampers are used to control the location and direction of the third resultant flow allowing treated air to be moved at designated speeds to and from specific locations within the oven for controlled lengths of time. The resulting airflow may be directed horizontally across horizontally laid product or vertically across vertically hung products thereby minimizing times where treated air is blocked by the either product or its support racks. This yields improved product uniformity, consistency, temperature, and moisture content while improving food safety and product yield with reduced processing time.

24 Claims, 14 Drawing Sheets

(56) References Cited

U.S. PATENT DOCUMENTS

| | | | | |
|---|---|---|---|---|
| 5,431,093 | A * | 7/1995 | Dodgen | A47J 37/042 126/25 R |
| 5,615,603 | A * | 4/1997 | Polin | A21B 1/26 126/21 A |
| 5,676,870 | A * | 10/1997 | Wassman | F24C 15/325 126/21 A |
| 5,704,278 | A * | 1/1998 | Cross | A21B 1/46 126/21 A |
| 5,718,164 | A * | 2/1998 | Finken | A23N 12/08 34/134 |
| 6,060,701 | A * | 5/2000 | McKee | F24C 15/322 126/21 A |
| 6,278,098 | B1 * | 8/2001 | Han | F25D 23/12 126/21 A |
| 6,460,451 | B1 * | 10/2002 | Helman | A23L 7/187 99/323.5 |
| 6,868,777 | B1 * | 3/2005 | Higgins | A23B 4/044 426/314 |
| 6,943,321 | B2 | 9/2005 | Carbone et al. | |
| 7,055,518 | B2 | 6/2006 | McFadden | |
| 7,087,873 | B2 * | 8/2006 | Hayakawa | F24C 15/327 126/21 A |
| 7,804,684 | B1 * | 9/2010 | Aybay | H05K 7/20563 312/236 |
| 7,836,875 | B2 | 11/2010 | McFadden | |
| 7,967,002 | B2 * | 6/2011 | Inada | F24C 15/327 126/19 R |
| 8,006,685 | B2 * | 8/2011 | Bolton | A47J 37/0641 126/19 R |
| 8,839,714 | B2 * | 9/2014 | Schjerven, Sr. | A21B 1/245 126/21 A |
| 9,060,523 | B1 | 6/2015 | Buller-Colthurst | |
| 9,107,422 | B2 | 8/2015 | Howard et al. | |
| 9,204,661 | B2 * | 12/2015 | Ploof | A21B 1/33 |
| 2008/0105138 | A1 * | 5/2008 | Segato | F24C 15/2007 99/447 |
| 2008/0202350 | A1 * | 8/2008 | Maki | A21B 1/26 99/330 |
| 2008/0236404 | A1 * | 10/2008 | Ose | F24C 7/08 99/327 |
| 2009/0304886 | A1 * | 12/2009 | Greenfield | A23F 5/04 426/467 |
| 2011/0226137 | A1 * | 9/2011 | van der Eerden | A21B 1/48 99/477 |
| 2014/0311360 | A1 * | 10/2014 | Bartelick | F24C 3/124 99/468 |
| 2015/0264949 | A1 * | 9/2015 | Cox | A23B 5/0052 99/330 |

\* cited by examiner

AIR STREAM MANIPULATION WITHIN A THERMAL PROCESSING OVEN

CROSS-REFERENCE TO RELATED APPLICATION

This application is a non-provisional application claiming priority to an earlier filed U.S. provisional patent application entitled, "THERMAL PROCESSING OVEN'S AIR STREAM MANIPULATION," filed Jan. 26, 2015, and assigned Ser. No. 62/125,650, the contents of which are incorporated herein by reference.

BACKGROUND OF THE INVENTION

Field of the Invention

The present invention generally relates to thermal processing ovens, more specifically to thermal processing ovens having pressurized air streams, and particularly to methods for controlling the pressurized air streams within the thermal processing oven.

Description of the Related Art

Thermal processing ovens (smokehouses) are the standard equipment within the Food Processing Industry used to dry and cook food products using controlled heat and humidity. Their principle uses are either for the treatment of pet food for consumption, which falls under FDA guidelines, or for the treatment of food for human consumption, which falls under the guidelines of the USDA's public health agency the Food Safety Inspection Service (FSIS). These agencies require documentation through all stages of the food production, and particularly through the thermal processing step. This documentation is called Hazard Analysis and Critical Control Points or HACCP.

Existing thermal processing ovens are borderline in their compliance to Federal regulations due to internal blockages in their treated airflow patterns. These blockages are caused by product support structures (shelves/racks) and by the product being processed itself. This is most evident when processing horizontally laid out products, such as jerky, where the blockages within the oven cavity create inconsistent product yields, inconsistent texture (including color and density), and issues with product safety and shelf life (moisture content/cooking variances).

The product to be processed is typically positioned centrally within the oven cabinet during processing and is delivered to the oven via a fixed rack system for stationary processing (Batch Style) or is conveyed through the oven via mobile racking or a conveyor system (Continuous or Intermittent Style). The product itself is generally either hung (vertical design) or laid flat on the racks or conveyer belt (horizontal design). The product arrangement primarily depends on the type of product being processed, wherein links and sticks are usually hung vertically suspended from supports, and wherein laid-out products, such as jerky, are arranged horizontally on screens.

Thermal processing ovens often have heating and humidity controlled by a programmable logic controller (PLC). In addition to temperature and humidity, the PLC may also control the operation of a main recirculation fan which can deliver a pre-determined volume of air, under pressure, to a system of ductwork. In prior art ovens, this airflow from the main recirculation fan is typically delivered internally to the sides of the oven, flows around the product and exits the oven from the top of the oven in a central location below the main recirculation fan. The air is then retreated and recirculated. The pressurized airflow discharging off the main recirculation fan and flowing down the sides of the oven may be controlled by one or two dampers which further restrict the airflow. These damper(s) may be opened in varied proportions and limit the volume of airflow from one side of the oven to the other.

Vertical Airflow Design (Approximately 90% of Existing Oven Designs)

In a vertical airflow thermal processing oven, dampers are used to control the volume of airflow to the insides of the oven. That airflow then is returned in an upward movement back to the main recirculation fan. The dampers of the prior art may be set to either rotate or modulate through a fixed timed cycle, thereby cyclically increasing and decreasing the air's volume and velocity entering the oven and moving the treated air from side to side. These dampers are often found in pairs and are set to rotate perpendicularly to one another, meaning the dampers are staggered at a 90-degree offset. This creates a slow side to side motion, at approximately 1 cycle per minute. The prior art damper system typically creates two airstreams entering the oven sides, both of which are fed by the main recirculation fan. If the paths of the two airflows meet they create a turbulent airflow. The contact point of the two airflows, called a breakpoint, varies in location as the dampers vary the airflow delivered to the oven. Since the dampers are rotating with a perpendicular offset the air entering the internal ducts around the damper blades has an unstable pressure within the oven's internal ductwork. This creates different pressures as the airflow enters the oven. In prior art ovens these dampers are typically linked via a chain which is driven by a single motor with gear reduction, or by individual motors with gear reduction. The motor(s) or linked chain drives move the dampers through a full 360 degrees of rotation. Oftentimes, the two dampers are placed into a staggered angular orientation before being chained together in the system to create the variance in the flow from side to side as the motor(s) turn the dampers. This causes the airflow combination location to move in a repeated and fixed course within the oven on a path which cannot be varied. This fixed path is the cause of overcooking in some areas of the oven and undercooking in other areas.

Since the dampers' cycles are fixed by the nature of the connected drives and/or chain driven dampers, the treated air's breakpoint is delivered at the bottom of the oven's floor of the oven approximately one-third of the total cycle time. Since the dampers are connected to a fixed movement, the breakpoint cannot be adjusted to any other location outside of the dampers' set cycle time. This yields a system wherein the product, more so a horizontally laid product, will block a resulting airflow occurring at the base of the oven as the rising air is immediately blocked by the racks and the bottommost product.

When the airstream breakpoints are concentrated at the bottom of the oven and are blocked by the bottommost product, the bottom third of the product in the oven becomes overcooked while the top third of the product could be under cooked within the normal time frame provided by the oven's controller. The oven's PLC cannot correct this situation, so the oven operator must manually change the oven's PLC program to allow the whole product load to remain in the oven until the top products are fully cooked. This further dries and overcooks the bottom product leading to even greater yield losses and uniformity issues. This in turns leads to package give away (having to pack a higher weight per package since the product weights are varied) and increased product rework (having to reprocess some of the product due to being out of spec) as well as throwing away some product which is not acceptable. Further, this problem also creates a longer cooking cycle which reduces product outputs (volumes).

Horizontal Airflow Design (Approximately 10% of Existing Oven Designs)

As in the case of the vertical airflow design, the horizontal airflow design also uses a PLC temperature controller, a main recirculation fan and air flow dampers. The airflow however is concentrated and delivered horizontally once it enters the oven through the use of fixed internal air plenums which are located on either side of the oven's left and right walls. These fixed sidewall plenums accept the fan's full air volume which is then turned sideways and discharged out of a series of openings toward the horizontally laid products. However, when the airflow is discharged from sidewall plenums, the treated air is discharged through the series of openings into the oven at a certain velocity. However once the air leaves the series of openings and enters the large cavity of the oven, the pressure abruptly drops, causing the resulting velocity of the airflow to drop. The airflow's outward velocity further decreases as it moves away from the original discharge point. The universal fan laws state; Velocity (FPM)=Volume (CFM)/Area (sq. ft.). As the Area increases and the volume remains the same, velocity decreases. This promptly creates a reduced and laminar airflow from the supply plenums. This situation exists even if the blower fan were reversed, pulling air into the plenums. The result is that the product located closest to the sidewalls will cook faster than the product located centrally to the oven. This results in undesired temperature variations, relative humidity differences and moisture content dissimilarity causing food safety concerns and product variations.

Other Failed Attempts to Solve the Air Flow Problem.

A few other prior art references are noted: U.S. Pat. Nos. 4,603,491 and 4,250,917 are both directed to reversible cross (horizontal) flow. Both of these design suffers the same issues as the horizontal oven mentioned above in that it uses laminar airflow flowing from a fixed position.

U.S. Pat. No. 6,943,321 is directed towards horizontal airflow having two adjacent blowers creating two zones within an oven. Since the pressurized air streams do not interact with each other they do not create a turbulent interaction between airflows.

U.S. Pat. No. 9,107,422 is directed towards changing airflow patterns within an oven utilizing a forward fan and a reversing fan. These fans are positioned in different areas of the oven to apply heated air over different areas of a continuous belt. These airstreams do not meet one another.

The invention described herein solves the above disadvantages by providing a method for manipulating an air stream within a thermal processing oven. In the instant invention two or more airflows converge creating a new turbulent airflow which envelopes the product rendering better uniformity. This is accomplished by using one or more dampers which are independently manipulated to control the airflow of two or more treated airstreams within the oven. Individualized damper control allows the converging airflows to be positioned anywhere along walls of the oven creating a turbulent airflow which exits their convergence point in a direction different from that of the uncombined flows. This resulting third flow can be caused to pause (dwell) anywhere along the walls of the oven and can be adjusted to direct airflow across the product in areas where overcooking or undercooking is prone to occur.

Further, this invention will position the airflows' breakpoints within a food processing oven in programmed orientation, including vertically, diagonally or horizontally and may be done so under computer control. This allows the airflow to be programmed to move up or down, sideways or across the interior of the oven over a programmed time frame and can dwell at any location, for any programmed length of time. With this ability to position the airflows' breakpoints, both vertical hung and horizontally laid products benefit by positioning the airflows under precise control.

INVENTOR'S BACKGROUND ART

This patent hereby incorporates by reference patent, U.S. Pat. No. 9,060,523, by Guy E. Buller-Colthurst to a "Thermal Process for Food Enhancement." This patent discusses methods for improving the lethality concerns in the processing of jerky style products and is a process suitable for use with the invention described below.

SUMMARY OF THE INVENTION

One method for controlling a resultant air stream within an oven comprises the steps of providing an enclosure having a heat source and a main recirculation fan. The treated air from the main recirculation fan is then divided by a modulating damper into two airstreams each of which exit from a first and a second air discharge orifice. The modulating damper itself is capable of being positioned between a first position and a second position biasing the airflow between the air first and second discharge orifice.

The process is then carried out by positioning the modulating damper to the first position causing the first airflow to converge with said second airflow at a first breakpoint location within the enclosure creating a combined turbulent airflow in a new direction. The modulating damper is then repositioned to the second position moving the combined turbulent airflow from the first breakpoint location to a second breakpoint location. Thereafter the damper is positioned back to the first position returning the combined turbulent airflow from the second breakpoint back to the first breakpoint location.

Another method for controlling a resultant air stream within an oven comprises the steps of providing an enclosure having a heat source and a main recirculation fan. The air from the main recirculation fan is then divided into two or more airstreams each of which exit from a first and a second air discharge orifice. The first airflow velocity exiting from the first orifice is limited by a first variable damper and the second airflow velocity exiting from the second orifice is limited by a second variable damper. The first variable damper is capable of being positioned between a first position and a second position and the second variable damper capable of being positioned between a third position and a fourth position.

The process is then carried out by positioning the first variable damper to a first position and positioning the second variable damper to the third position causing the first airflow to converge with said second airflow at a first breakpoint location within the enclosure creating a combined turbulent airflow. The first variable damper is then repositioned to the second position and the second variable damper is repositioned to the fourth position moving the combined turbulent airflow from the first breakpoint location to a second breakpoint location. Thereafter the dampers then are positioned to their original locations returning the combined turbulent airflow from the second breakpoint back to the first breakpoint location.

In still another form of the invention, the method for controlling a resultant air stream within an oven comprises the steps of providing an enclosure having a heat source and a main recirculation fan. The air from the main recirculation fan is then divided into two or more airstreams each of which exit from a first and a second air discharge orifice. The first airflow velocity exiting from the first orifice is limited by a first variable damper and the second airflow velocity exiting from the second orifice is limited by a second variable damper wherein the first variable damper is capable of being positioned between a first position, a second position, a third position and a fourth position, and the second variable damper is capable of being positioned between a fifth position, a sixth position, a seventh position, and an eighth position.

The process is then carried out by positioning the first variable damper to a first position and positioning the second variable damper to the fifth position causing the first airflow to converge with said second airflow at a first breakpoint location on a first side of the oven enclosure creating a combined turbulent airflow. The first variable damper is then repositioned to the second position and the second variable damper is repositioned to the sixth position moving the combined turbulent airflow from the first breakpoint location to a second breakpoint location, also located on the first side of the enclosure. Thereafter the dampers then are positioned to their original locations returning the combined turbulent airflow from the second breakpoint back to the first breakpoint location.

After the breakpoint is returned to the first breakpoint position, the first variable damper is transitioned to the third position, and the second variable damper is transitioned to the seventh position, thereby moving the breakpoint to a third breakpoint position which is located on the second side of the oven enclosure. The first variable damper is then transitioned to a fourth position, and the second variable damper is transitioned to an eighth position thereby moving the breakpoint to a fourth breakpoint location on the second side of the oven enclosure. Thereafter the breakpoint is transitioned from the fourth breakpoint location back to the third breakpoint location.

In yet another form of the invention the method for controlling a resultant air stream within an oven comprises the steps providing a Programmable Logic Controller (PLC) having a cycle counter and a Human to Machine Interface, an enclosure having a heat source, and a main recirculation fan. The air from the main recirculation fan is then divided into two or more airstreams each of which exit from air discharge orifices. The first airflow velocity exiting from the orifices is limited by a first variable damper and the second airflow velocity exiting from the orifices is limited by a second variable damper, wherein the first variable damper is capable of being positioned between a first position, a second position, a third position and fourth position and the second variable damper is capable of being positioned between a fifth position, a sixth position, a seventh position and an eighth position. A first servo motor is provided and attached to the first variable damper and used to control its position. Similarly, a second servo motor is provided and attached to the second variable damper and is used to control its position. Both servo motors are controlled by the PLC. Further, when the servo motors are not actively being repositioned, a servo brake is applied preventing the variable dampers from changing orientation.

The process is then carried out by positioning the first variable damper using the first servo motor into a first position and positioning the second variable damper using the second servo motor into the fifth position causing the first airflow to converge with said second airflow at a first breakpoint located on a first side of the enclosure creating a combined turbulent airflow. The first variable damper is then repositioned to the second position and the second variable damper is repositioned to the sixth position moving the combined turbulent airflow from the first breakpoint location to a second breakpoint location also located on the first side of the oven enclosure. Thereafter the dampers then are positioned to their original locations returning the combined turbulent airflow from the second breakpoint back to the first breakpoint location. The breakpoint is then shifted between the first breakpoint position and the second breakpoint position a number of times according to a number stored in said cycle counter before transitioning to the next step.

After the breakpoint has transitioned from the second breakpoint to the first breakpoint position for a number of times according to a number stored in said cycle counter, the first variable damper is then transitioned to the third position, and the second variable damper is transitioned to the seventh position, thereby moving the breakpoint to a third breakpoint position which is located on the second side of the enclosure. Thereafter the first variable damper is transitioned to a fourth position, and the second variable damper is transitioned to an eighth position thereby moving the breakpoint to a fourth breakpoint location on the second side of the oven enclosure. Next, the breakpoint is transitioned from the fourth breakpoint location back to the third breakpoint location a number of times according to a number stored in said cycle counter before returning again to the first breakpoint located on the first side of the enclosure.

In order to automate the above process, the number of repetitions between the breakpoints, the transit time between the breakpoints, as well as the dwell time (hold time) at each of the breakpoints is controlled by the PLC, wherein there are two or more consecutive cycles on the first and on the second sidewall. Additionally, to aid the operator, a representation of the current damper positions for the first variable damper and the second variable damper are displayed on the screen of a Human to Machine Interface which is connected to the PLC.

BRIEF DESCRIPTION OF THE DRAWING FIGURES

Other advantages of the present invention will be readily understood by reference to the following detailed description in connection with the accompanying drawings wherein:

FIG. 1 shows a schematic view of the invention's control functions wherein the top left side depicts a traditional oven's control system, and the right side details the inventive damper control system fitted to a traditional HVAC which delivers the treated airflow.

FIG. 2 shows a profile view of an oven, showing the dampers 61, 63 fully open and in the 0 degrees' position within the 360 degrees' rotation area.

FIG. 3 shows a profile view of the oven with the left damper open (10%) and the right damper open (90%), positioning the breakpoint 98, creating a horizontal airflow at the top left wall 116 of the oven 68.

FIG. 4 shows a profile view of the oven with the left damper open (20%) and the right damper open (80%), positioning the breakpoint, to create a horizontal airflow at the middle left wall 116 of the oven 68.

FIG. 5 shows a profile view of the oven with the left damper open (30%) and the right damper open (70%), positioning the breakpoint 100, creating a horizontal airflow at the lower left wall 116 of the oven 68.

Figure 9:
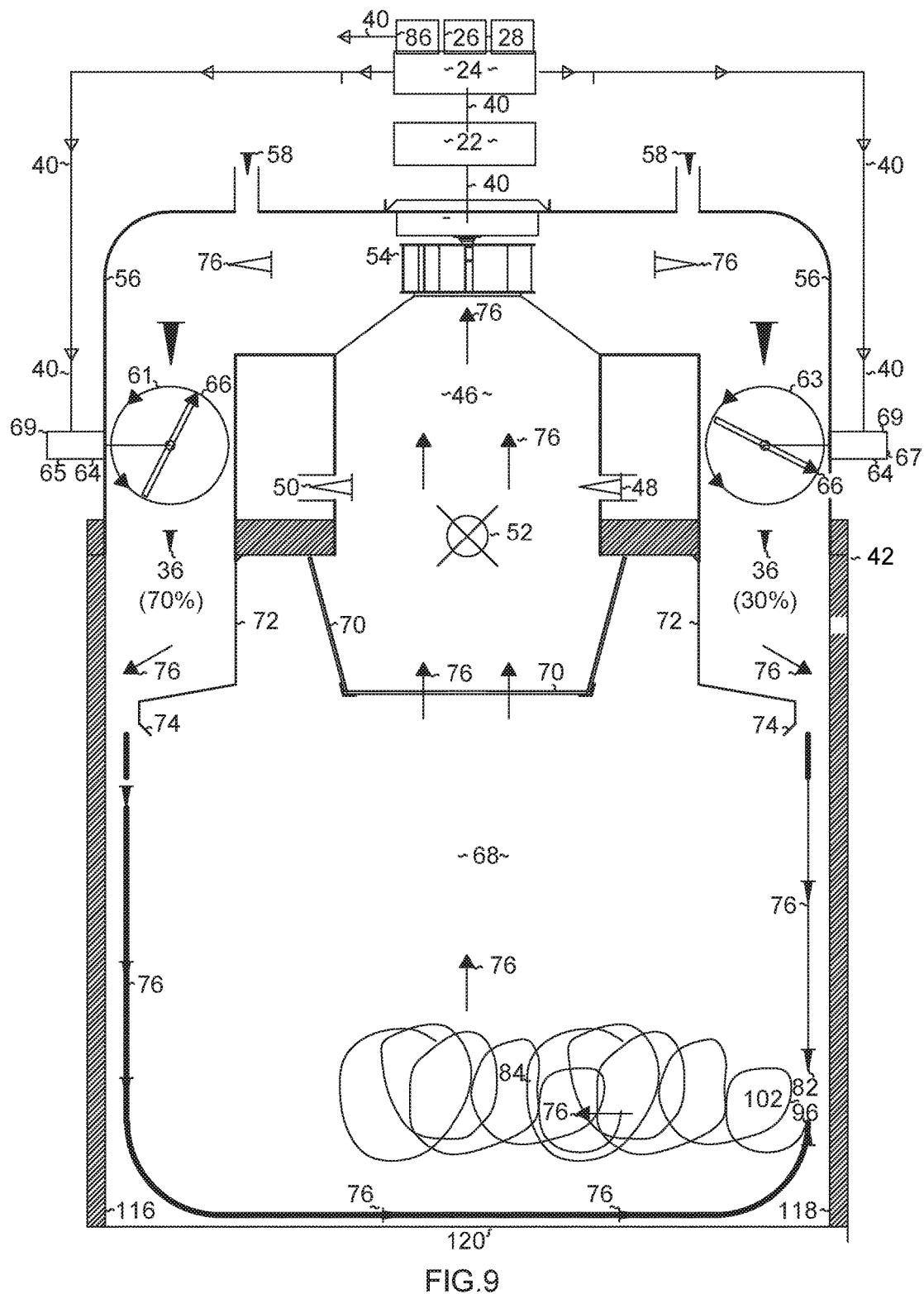

FIG. 9 shows a profile view of the oven with the left damper open (70%) and the right damper open (30%), positioning the breakpoint 102, creating a horizontal airflow at the lower right wall 118 of the oven 68.

Figure 10:
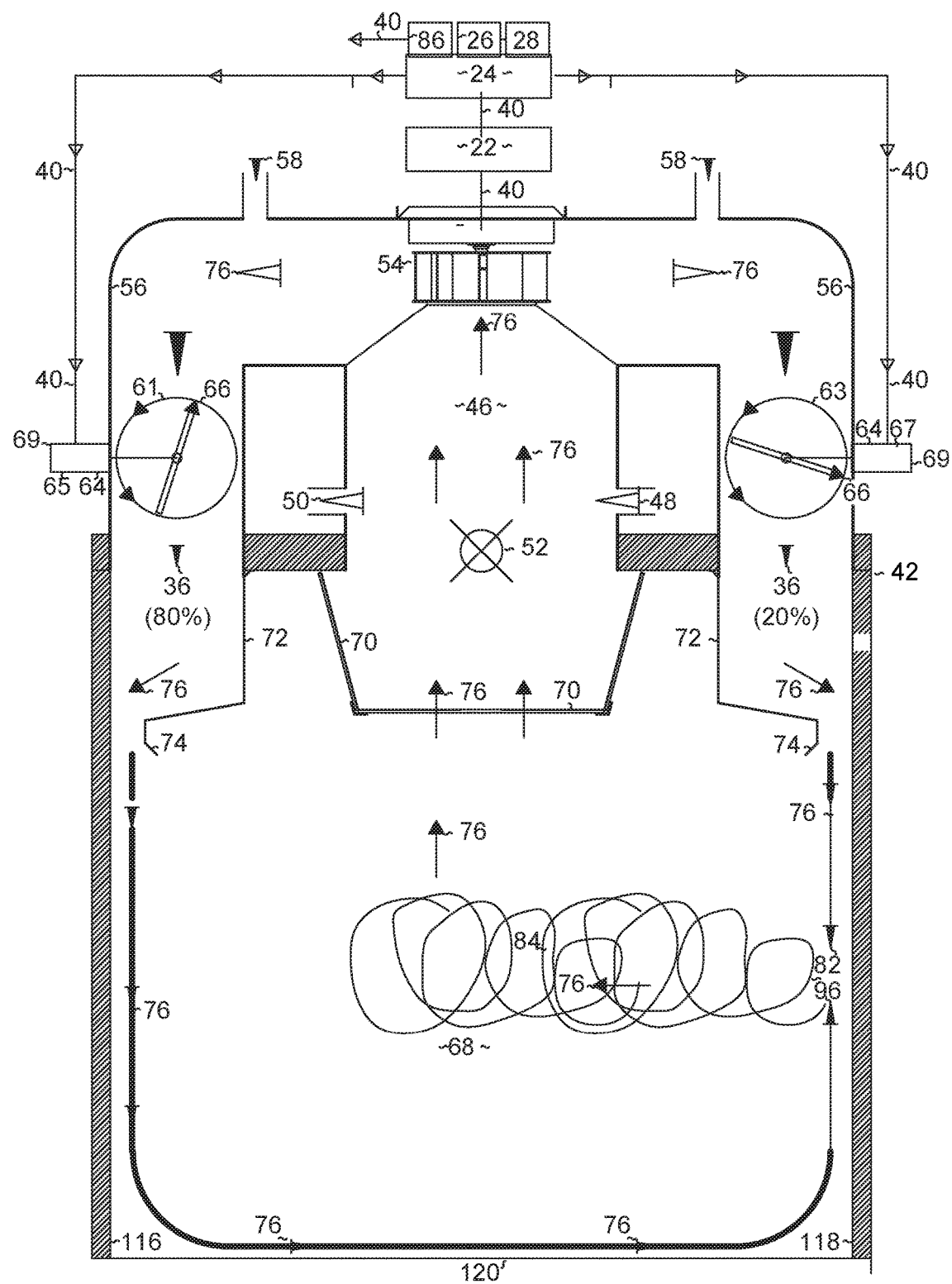

FIG. 10 shows a profile view of the oven with the left damper open (80%) and the right damper open (20%), positioning the breakpoint to create a horizontal airflow at the middle right wall 118 of the oven 68.

Figure 11:
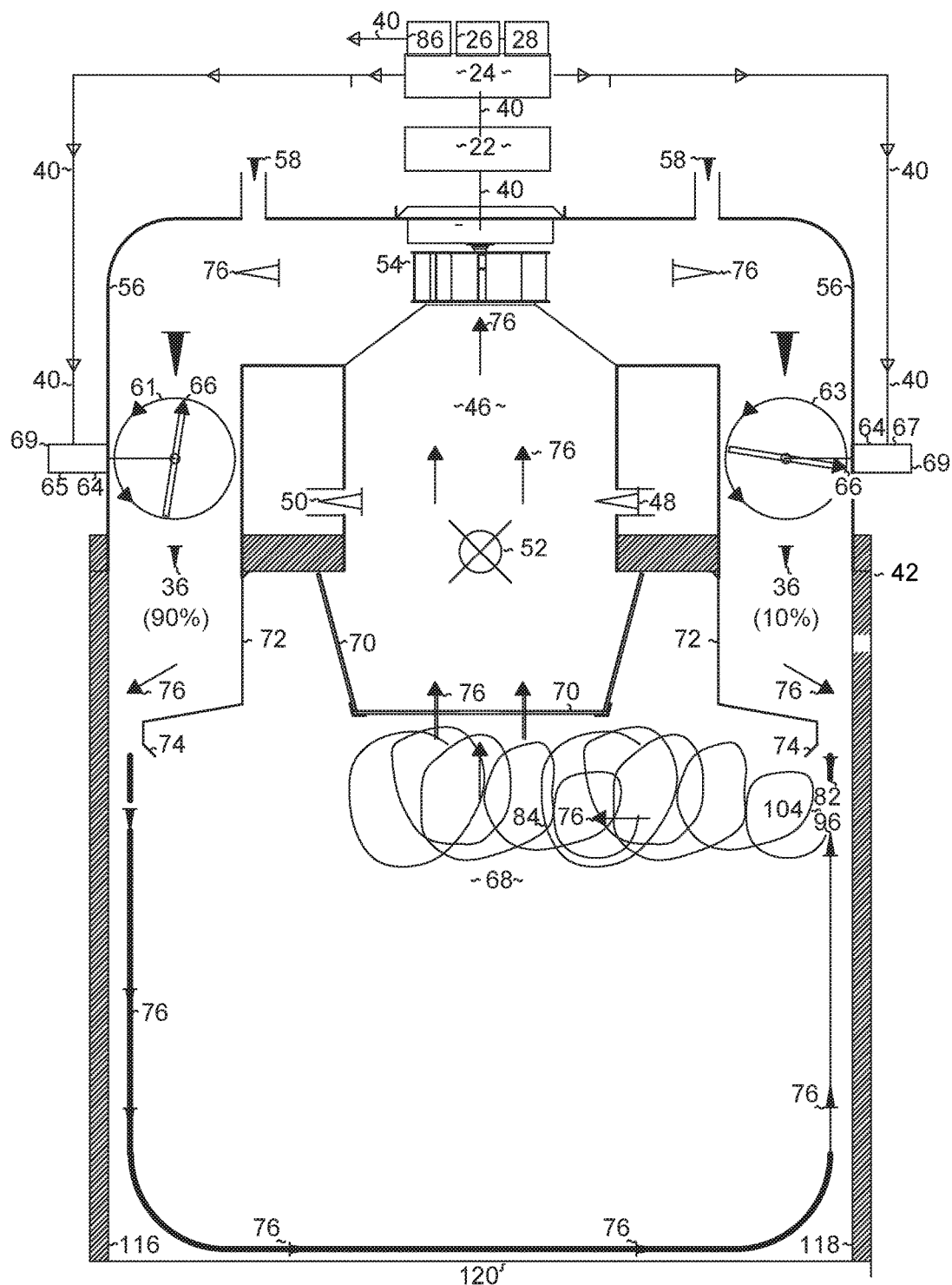

FIG. 11 shows a profile view of the oven with the left damper open (90%) and the right damper open (10%), positioning the breakpoint 104, creating a horizontal airflow at the top right 118 of the oven 68.

Figure 12:
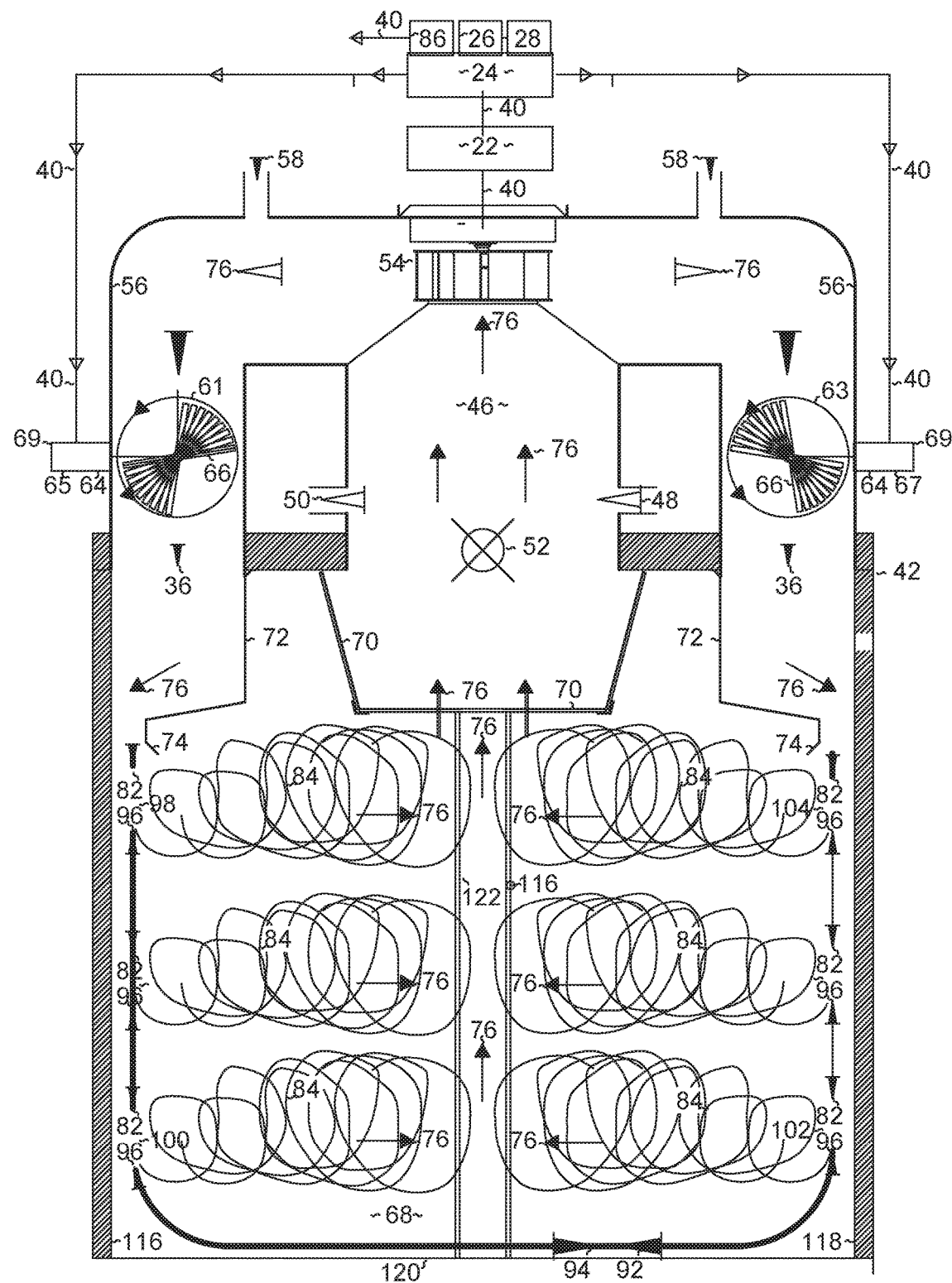

FIG. 12 shows an alternate embodiment of the invention incorporating a central plenum 122 and the left and right damper's positions corresponding to the breakpoint locations described above.

Figure 13:
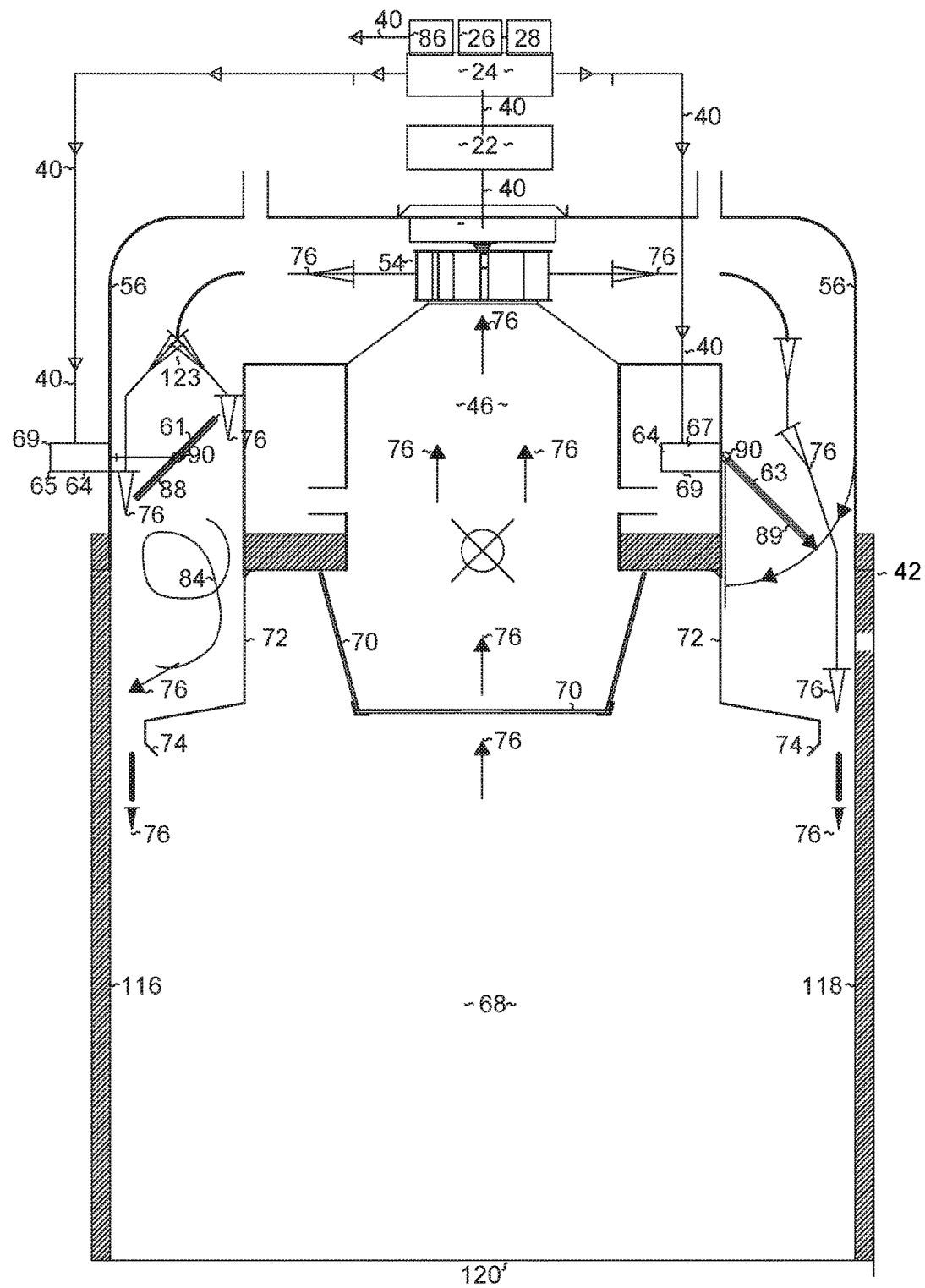

FIG. 13 shows an alternate embodiment of the invention incorporating a modified damper design 89 reducing the internal supply duct's 72 air turbulence 84 prior to entering 74 the oven.

Figure 14:
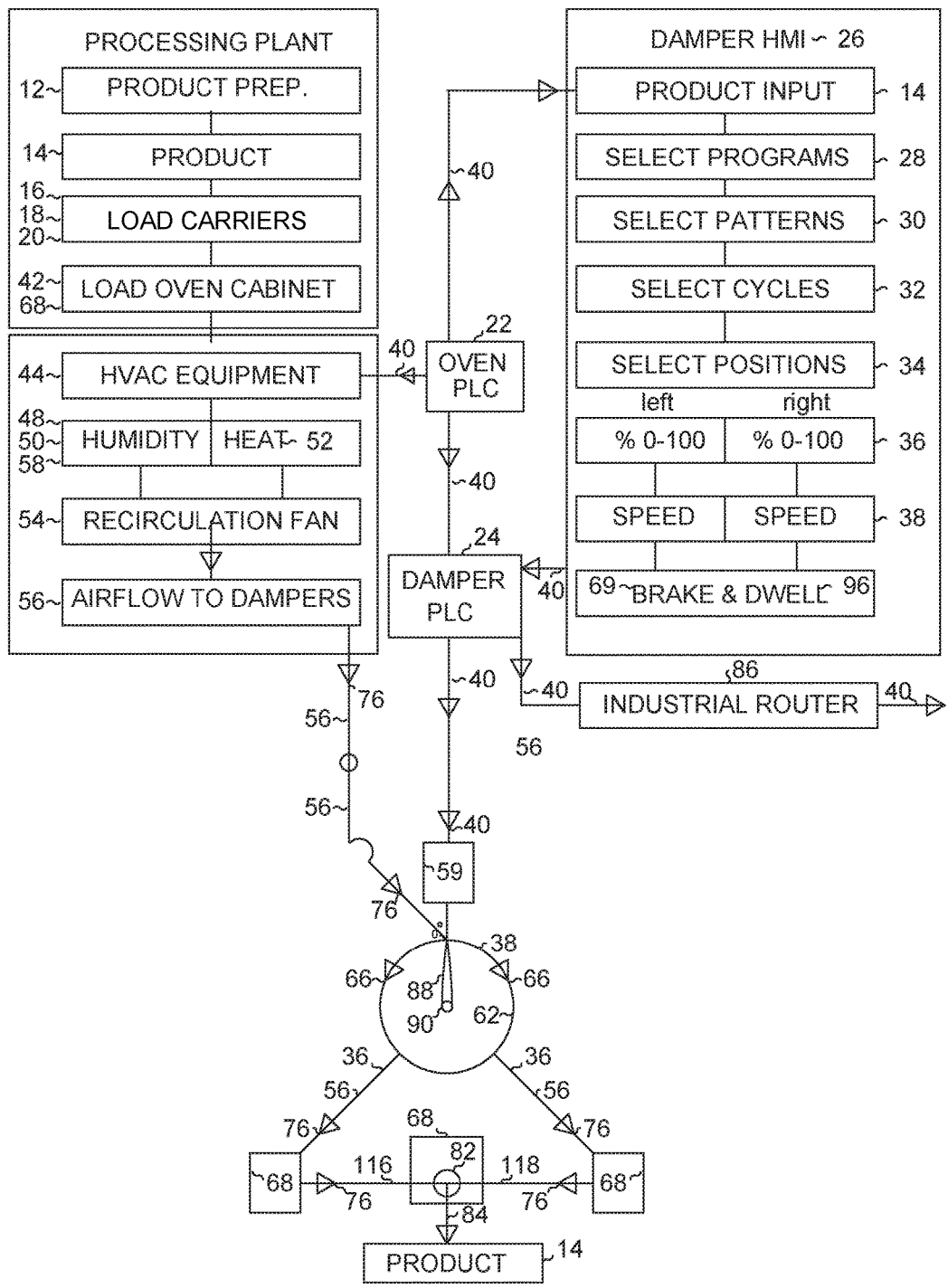

FIG. 14 shows a schematic view of the inventive damper control system which when fitted to a traditional HVAC will deliver treated airflow to an oven via the division of treated airflow into at least a first and a second airstream using a modulating damper.

DESCRIPTION OF THE VARIOUS EMBODIMENTS

Figure 1:
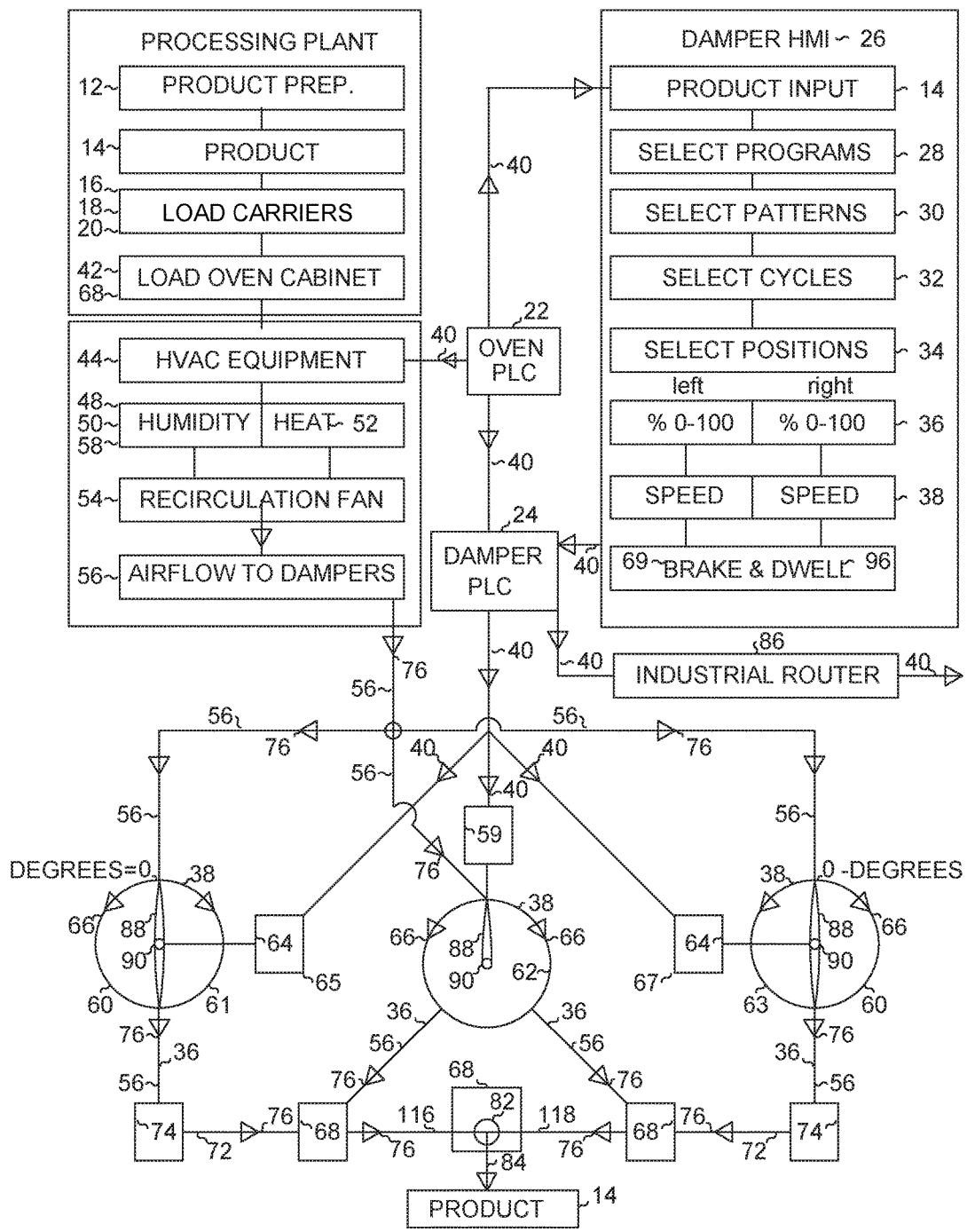
Figure 2:
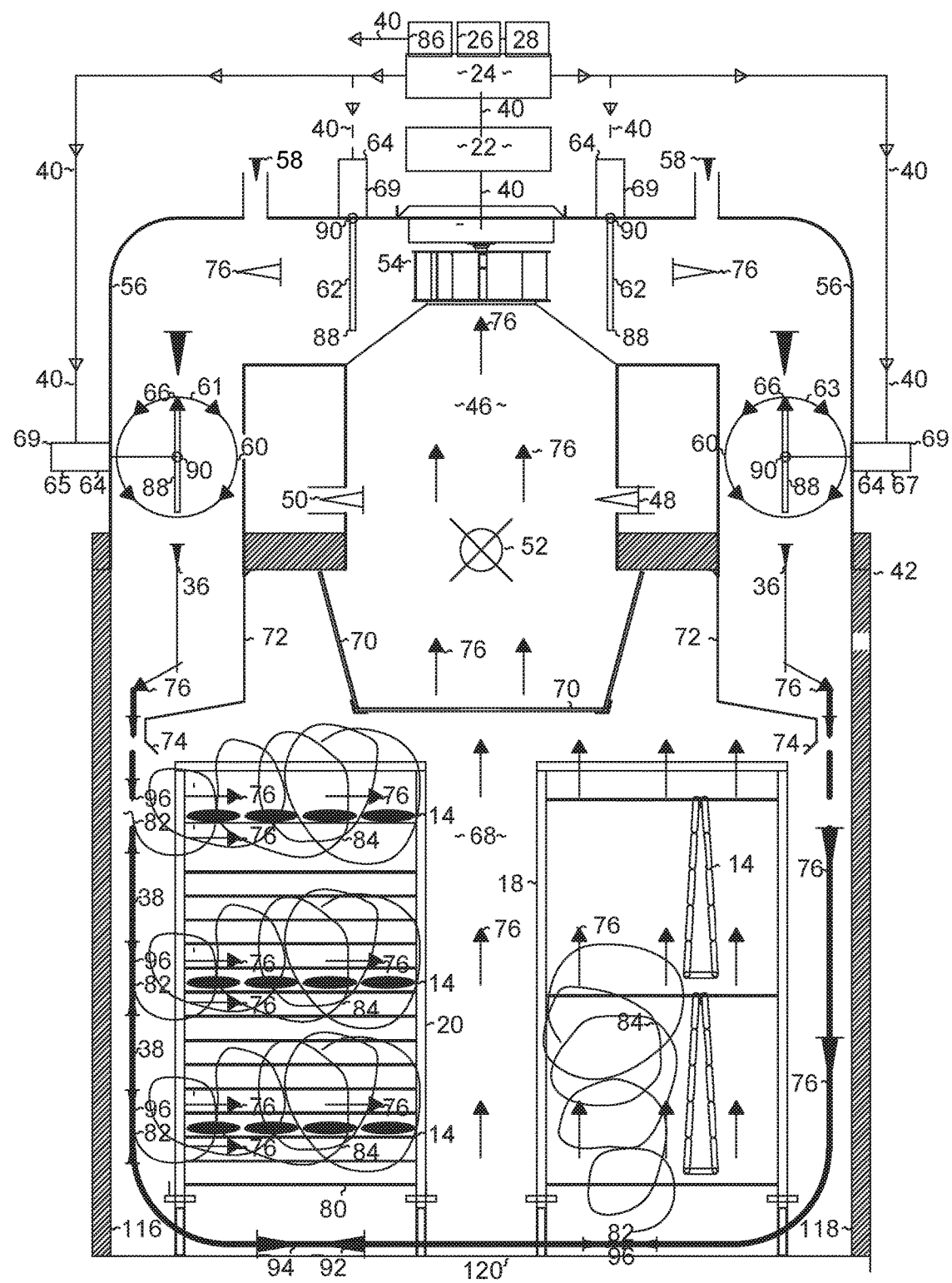

For purposes of the following description, the terms "upper," "lower," "left," "right" "rear," "front," "vertical," "horizontal", "diagonal", and derivatives of such terms shall relate to the invention as oriented in FIG. 2. However, it is to be understood that the invention may assume various alternative orientations and configuration, except where expressly specified to the contrary. It is also to be understood that the processes illustrated in the attached drawings, and described in the following specification are simply exemplary embodiments of the inventive concepts described herein. Specific dimensions and other physical characteristics relating to the embodiments disclosed herein are not to be considered as limiting unless expressly stated otherwise.

The inventive thermal processing oven 42 is suitable for industrial and commercial use in cooking and drying food products such as meat, poultry and fish products by combining controlled dry heat 52 and controlled humidity 48, 50, 58 inputs for scheduled periods of processing times. The temperatures and relative humidity within the oven 68 during the processing times are controlled 22, 44 by set points. This thermal environment is transmitted onto the product by pressurized airflow 72, 74 generated by a main recirculating fan 54.

The vertical airflow is directed into two streams 36 from one side to the other side of the oven 68 by external dampers 60, 62 which modulate or rotate, at a set time cycle, thereby increasing and decreasing the volume 36 and therefore the velocity of the two airstreams 36. The dampers 60, 62 create an airflow 36 from either side which can be increased or decreased as the dampers 60, 62 are adjusted. Due to the orientation of the dampers, the two airstreams collide 82 creating turbulence 84 which flows in a separate and different direction from the first two airflows. This occurs since the two airflows are primarily flowing in opposite directions to one another within the oven. This breakpoint is controlled 24, 26 by the processes detailed within this invention to eliminate the time that the airflow is located at the bottom 120 of the oven 68 and therefore at the bottom of the product 14. This invention rotates 60 or modulates 62 the dampers under controlled programming 24, 26 as to manipulate the air flow by positioning the opposing airflows to collide (breakpoint) 82 with one another anywhere within the two airflow's 36 paths.

To control the dampers' 60, 62 movements 66 we use programmable actuators 64, including but not limited to servo (or stepper) motors which provide a rotational motion, and/or linear style actuators providing a longitudinal motion. These dampers are in turn controlled by a programmable logic controller (PLC) 24 which receives programming input 40 from a human machine interface (HMI) 26, or other input device. The PLC 24 and HMI 26 components are programmed to control and drive the actuators outputs thereby controlling the damper's position, preferably by providing a driving force to the damper's shaft 90.

The damper actuators are independently controlled by the PLC 24 with control inputs 40 from the HMI 26, and each can independently control one or more airflows. The actuators 64 have precise rotation or linear positioning to control the dampers 60, 62 into any position 66 within that rotation or linear movement. The damper blades 88 which control and divert the airflows volume and velocity 36 within the oven are directly coupled to these damper shafts 90. With independent control 24, 26 of the damper actuators 64, the dampers shafts 90, and damper blade's 88 position 66, either via rotation or modulation, the system is able to output controlled volumes and velocities of airflow through each orifice of the damper's discharge 72.

Once the air enters the oven 68 through the discharge openings 74 it now has the ability to be controlled within programmed 28 timed cycles 32. These cycles 32 control the damper blades' 88 positions 66 to adjust the airflow 36 and therefore the breakpoints 82 up and down the walls and across the oven's floor on a singular or repeatable cycle(s) 32 and at a designed, timed rate of movement 38, dwelling at some points 96 when required and then again moving up 92 or down 94 the oven's walls. This continues until the controlled program 24, 26 changes the pattern 30 and positioning 34, beginning a new pattern 30 and positioning 34 for the selected cycle 32 and speed of movement 38.

The two or more airflows, 36 are diametrically opposed to one another and continuing to interact at a point or line of contact 82 that creates a continuous turbulence 84. In one form of the invention, this turbulence exits from the convergence location 82 in a direction different from that of the input airflows. In a preferred form, the new direction of flow is perpendicular to the input streams and is oriented to cross horizontally over the product's mass 18, 20.

The convergence of airflow's contact 82 can be held at a point along the oven's wall by locking the dampers 88, 90 for a period of time referred to as a dwell time, preferably by using a servo having brakes. This dwell time 96 will occur when controls 24, 26 signal to hold the dampers by issuing a braking 88 command. This braking step holds the dampers 88, 90 in a locked position and does not allow the damper to rotate or move. This is advantageous because it prevents actuators 64 from continually searching or hunting for a true position against the airflow passing by the damper. Hunting causes premature wear to the servo motors and should be avoided. The precision hold (dwell) 96 is released by the controls 88, 90 when the damper actuators 64 are given a new position set point 34. The dampers 88, 90 can turn or modulate independently clockwise or counter clockwise, up to 360 degrees 66, on demand.

With this invention, we are able to control the movement 38 and position 34 of the airflows 36 paths and therefore breakpoints 82 at programmed 28 speeds 38 and dwells 96. By holding the dampers in place under braking, we allow the airflows 36 to have the ability to better contact the product 14 in a turbulent flow. This allows for the ability to better treat the products 14 from top to bottom and from side to side.

Further, by controlling the airflow position 34 and the duration 96 of time the airflow remains in that position(s) 34, we can allow for the two or more airstreams to collide and move outward from the initial collision point (breakpoint) 82. This outward flow of combined air is highly turbulent 84 due to the collision of the two airstreams 36. The PLC programs 28 are designed to move the collision point of the air streams along either oven wall, and across the bottom of the oven. The direction of the resulting combined airflow is typically perpendicular to the ovens internal structure (116, 118, and 120), however, the resulting combined flow may be directed at other angles (even diagonally) by controlling the airspeed velocity and flow rates using the dampers (60, 62) in combination with variations in the blower 54 speed and direction.

In a preferred form of the invention, the two or more airstreams 76 meet at a breakpoint 82, where their two volumes combine and push outward in direction principally perpendicular to the original streams. The combined airflow is highly turbulent and since its oriented perpendicular to the ovens internal structure (116, 118, and 120) and the airstreams 76, is well suited to traverse across the product mass 14. When product is laid flat, the breakpoint is aligned on a sidewall of the oven, and the combined third airflow traverses in a horizontal direction. When the product is hung vertically, the breakpoint may be aligned on floor of the oven causing the combined airflow to traverse in a vertical direction. These two methods of passing turbulent airflow over the product results in a more consistent envelopment in and around the products 14 because the two airflows are combined within the interior volume of the oven. This minimizes the airspeed's variation as the flow traverses across the product since there is less pressure change. Thus, the invention yields the ability to better control 24, 26 the product's 14 temperature profile within Federal requirements. This process also gives the ability to dry the products 14 more uniformly on the racks or carriers 16 since the product 14 can now be subjected to different airstream dwell times 96 on and within separate product 18, 20 areas in the oven 68.

Further improving upon this process is the ability to vary and control the airflow rates by electronically controlling the 36 damper positions through the use of a PLC 24 and HMI 26 allowing the breakpoint to be concentrated in one area of the oven allowing the topmost products to be fully cooked, while preventing the bottommost products from being over cooked. This yields a product with uniform texture, appearance, temperature and moisture control in a shorter processing/cooking time, with increasing production throughput, resulting in a greater product 14 volume output in existing 68 and new built ovens 68.

Another improvement when processing horizontally laid products is to eliminate approximately ⅓ of the time the airflow is concentrated at the bottom of the oven 120 below horizontally laid products by accelerating the traversal of the airflow movement 76 between the sides of the oven (116, 118). This avoids the blocked flow problems of the prior art and avoids the approximate ⅓ of the time the prior art airflow was overcooking the bottom product with blocked airflow. This is accomplished by manipulating the airflow 36 to control 24, 26 the damper rotation in degrees 66, or via modulation of the angles and times of rotation or modulation of the dampers 60, 62. By independently controlling 24, 26 the dampers 60, 62, 64 and causing a rapid adjustment between states, we can position 34 the air flows 36 to meet anywhere within the oven, and can do so as fast as the actuators can traverse to their next position. This is much quicker than the fixed traversal rate of the prior art and can practically eliminate the time the airflow convergence is located at the bottom of the oven.

When used with vertically hung products 18, the above principles are somewhat reversed, and the time where the breakpoint 34 is located on the sidewalls can be minimized. This maximizes the time the breakpoint spends flowing air upward and across the product. Even with vertically oriented product, the results of my invention show an improvement in product quality as the highly turbulent air is positioned under control in the oven enclosure. This yields little flow variation across products, granting a more uniform product as compared to prior art ovens.

An optional plenum 122 shown in FIG. 12 may be installed in the center of the oven to duct airflow back to the main recirculation fan 54. The plenum 122, if installed, helps prevent the return air from rising toward the roof of the oven as it transits across the product. By utilizing a plenum, the airflow across a horizontal product may further be controlled and a majority of product blockages eliminated.

Computer Control:

By combining a PLC 24 and HMI 26 a controls system is created which can control the programmable 28 damper actuators 64, allowing those dampers 60, 62 to rotate to any position 66 on a circular arc in a complete 360 degrees' circle or at any angular degree 66 within that circle. The speed 38 of the rotation 60 or modulation 62 may also be programmed 28 into the process cycle 32. These positions 66 are programmed 28 through the HMI 26 settings and PLC 24 ladder logic. The PLC program is initially based on empirical data collected manually or from within the PLC 22 itself, and will be adjusted through re-programming 24, 26 which will even-out the product 14 yields achieving better uniformity.

The PLC 22 can then be used to send a signal to start the program 28 and to the HMI 26 and the PLC 24 identifying the product to be processed. The damper's actuator(s) 64 are then controlled directing them to a particular area of opening based on the program 28 of the product being run, typically via an angular position command. This allows for full control of the resulting airflows 36 and allows the breakpoint to be positioned 34 via computer control. Using this method, the breakpoints 82 airflow can be positioned 34 anywhere beside, around, below or across the products 14. The PLC controls the position 34, the airflow direction 76, the airflows percentage 36, the dwell time 96, and the airflows time of movement 38. By positioning the dampers, and holding their position using servo brakes, dwell time at a location and traversal time 38 between positions 34 can be fully programmed.

The damper actuator's programming 28 can accommodate both horizontal and vertical airflows for a particular product 16, 18, 20. By implementation of this invention the product being thermally processed 44 is more consistent and uniform, and because of the turbulent airflow 84 and its controlled movement 76, the processing time is reduced increasing the product 14 volume output and throughput of the oven 68.

An additional benefit of computer control of this invention is having better control of the product's 14 moisture content. The moisture content and water activity in the final product can be continuously monitored by one or more sensors (temperature, humidity, airflow rate, etc.) placed inside the oven. These sensors provide various inputs to the PLC allowing for the recalculation of process parameters and adjustment of the program stored in its memory. This, in turn, causes a process adjustment in the dampers delivering a more uniform product according to specifications programmed and stored in the memory of the HMI and/or the PLC. Since the dampers can be set more accurately, and can be locked in place using servos 61, 63 having brakes 69, the process therefore is under tighter control 24, 26, and the resulting product has a longer shelf life and greater microbiological reductions contributing to improved food safety. Finished product 14 on a variety of products 14, of % moisture content and % water activity can be specified and held within the specific targets within the Federal requirements.

This process is further benefited by adding a computer controller because the product's mass 14 is better enveloped with turbulent air by pre-programming the break points into the control program 28 and by specifying a dwell time 96 at each point, as well as the transit time 38 between break points. The computer controller (HMI, PLC) can even adjust the program to achieve specified temperature profiles and reduction in delta T/RH (temperature and relative humidity variances) within the product 14 mass. This improves the lethality step reducing pathogen levels within the product 14 mass and improves product safety over unmonitored processes. By better enveloping the product 14 and enhancing the Log kill rate of pathogens and mold growth contributes to improved food safety and shelf life of the product. A further benefit of the invention is the uniformity and consistency of product within the oven 68, from the top to the middle to the bottom product's 14 mass, from the front to back and to side to side within the oven chamber 68.

Meeting Targets

Computerized control contributes to better food safety adherence. As an example, in the case of horizontally laid Jerky product 14, 20 which requires a Lethality step within its processing parameters; The airflow 36 manipulation design can concentrate airflow onto all of the product racks' 18, 20 or carriers' 16 elevations, thus it can better transport a more uniform prescribed air treatment 36, 38 during the Lethality step. In the current art, inconsistent airflows from bottom to top of the racks 18, 20 or carriers 16 prevents direct airflow onto the product for up to ⅓ of the cycle forcing some product to be under cooked failing meet Lethality targets. The programmable actuators 64 (motors or linear) will control 24, 26 the side to side modulation to control the airflows' 36 volume and velocity entering 74 the ovens 68 and then be controlled by the programs' 34, the patterns 30 and the positions 34 and their components set into the PLC 24 and the HMI 26.

In another form of the invention, a human to machine interface (HMI) 26 is programmed 34 to display the actual damper actuator 64 positions 66 and movements 38 by both degree and percent opened/closed during rotation or modulation. This can also be displayed in real time so operators can verify the dampers operation as well as programming 28 by product 14 type.

In yet another form of the invention, the PLC 24 may be programmed 28 to communicate 40 with the main oven's control panel 22 to accept signals 40 determining which product 14 is to be processed. The PLC then selects the correct corresponding program 34 controlling one or more of the following parameters: patterns 30, cycles 32, positions 34, dwell times 96 at those positions 34, percent open 36 at those positions 34, and the movement speed 38 from one position to the other position within the program. The PLC 24 then communicates 40 with the main oven's control panel 22 by sending and/or receiving signals 40 that start the selected process. Once started, the PLC's 24 program 28 manipulates the damper actuators 64 according to the settings 30, 32, 34, 36, 38 for that program which has been programmed 28 into the HMI 26. One preferred form of the PLC suitable for use with the invention is commercially available and includes the Compact Logix model, made by Allen Bradley.

In still another form of the invention, an industrial router 86 is located within the damper control panel 24 giving remote access to the damper control program from a computer. This allows remote control of the PLC 24, HMI 26, and damper actuator 64 controls. By utilizing a router 86, operators of the control system can remotely troubleshoot the system without the necessity of being onsite. With this built-in communication, changes to the programming can be made remotely to PLC the HMI and the damper actuator's 64 software.

Airflow Control

In addition to manipulating the dampers to control the breakpoint location within the oven, further advantage may be had by controlling the airflow rate delivered by the main recirculation fan 54 itself. When the main recirculation fan's airflow rate is controlled, further variation to the location and resulting orientation of the breakpoint may occur.

One method of controlling airflow is achieved by varying the speed of the oven's main recirculation fan 54 according to inputs provided to the motor from the PLC 22. In this method a variable frequency is the preferred method of controlling the motor speed. Through the manipulation of the main recirculation fan's speed, the flow rate (CFM) can be increased or decreased according to the process specification and necessary breakpoint location. By adding additional velocity to the airflow on one side of the oven, or by reducing the same, the location of the breakpoint can be varied within the oven. Further, by manipulating the airflow rates at a given damper setting, greater control of the angular orientation of the resulting breakpoint airflow occurs.

A second method of controlling airflow involves the use of a constant speed main recirculating fan 54 having a non-overloading characteristic. In this method, the motor speed can remain constant, while the airflow delivered to the oven can be further tailored by the degree of damper opening. If additional airflow is needed, both dampers may be opened in like proportions keeping the same breakpoint location, but increasing the airflow to that location. The reverse is also true, in that both dampers may be restricted in similar amounts reducing airflow. An alternate method of airflow control further includes adding additional dampers as shown in FIG. 2. These additional dampers are fitted adjacent to the main recirculating fan in the top of the oven and allow for additional control of the airflow arriving at the main control dampers.

Alternate Damper Shape:

As shown in FIG. 13 the shape of the damper itself may be altered to improve the system design. A novel solution which better controls airflow with minimized airflow turbulence and reduced servo loading is shown on the right hand side of the FIG. 13 at 89 and depicts a damper which is hinged at its topmost portion and is oriented to direct the restricted airflow toward the internal airflow entrance of the oven 74. In contrast, a conventional damper system 88 is shown on the left side of the figure and shows the airflow path 123 splitting in two around damper 88 resulting in a turbulent flow 84.

Figure 3:
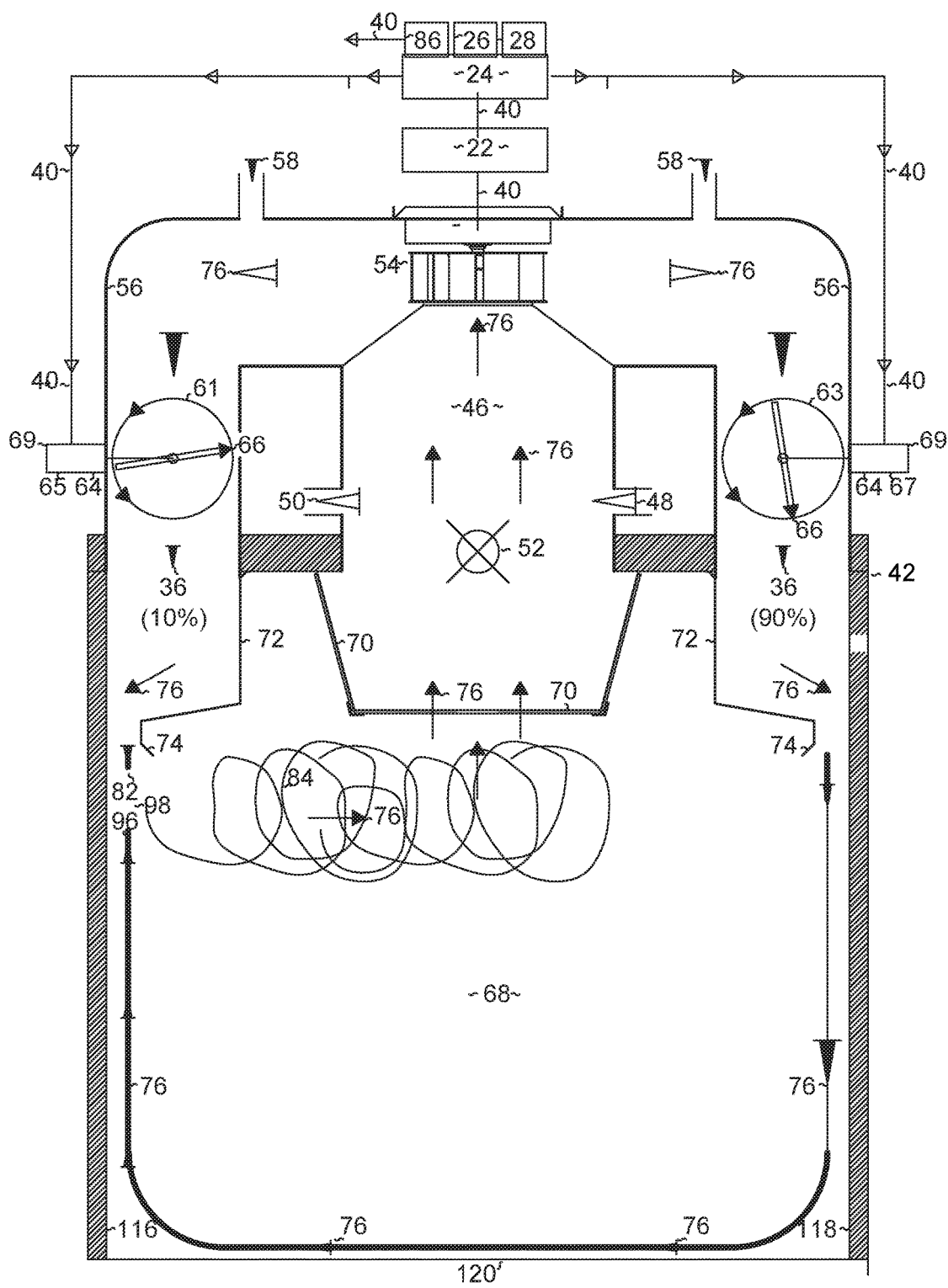

Example of the System in Operation:

In an exemplary embodiment describing a potential use of the invention, the PLC 24 directs the first servo motor 65 to move 38 the first damper 61 (left side of oven) to its programmed position 28 #1 at approximately 81° from 0° (damper about 10% open), and directs the second servo motor 67 to move 38 the second damper 63 (right side of oven) to its programmed position 28 #5 at approximately 171° from 0° (90% open), wherein the two servo brakes 88 are applied. This places the convergence point of the two airflows at a first breakpoint 98 located at the top left of the oven enclosure 68 as shown in FIG. 3 wherein the two converging airflows combine into a turbulent flow 84 in a third and different direction. This direction is typically perpendicular to the sidewall 116 of the oven and to the two incoming airflows. However, the resulting third direction of the airflow may be varied according to the flow rates of the incoming airflows, the damper positions, and the amount of air supplied by the main recirculation fan to other angles if needed.

Figure 4:
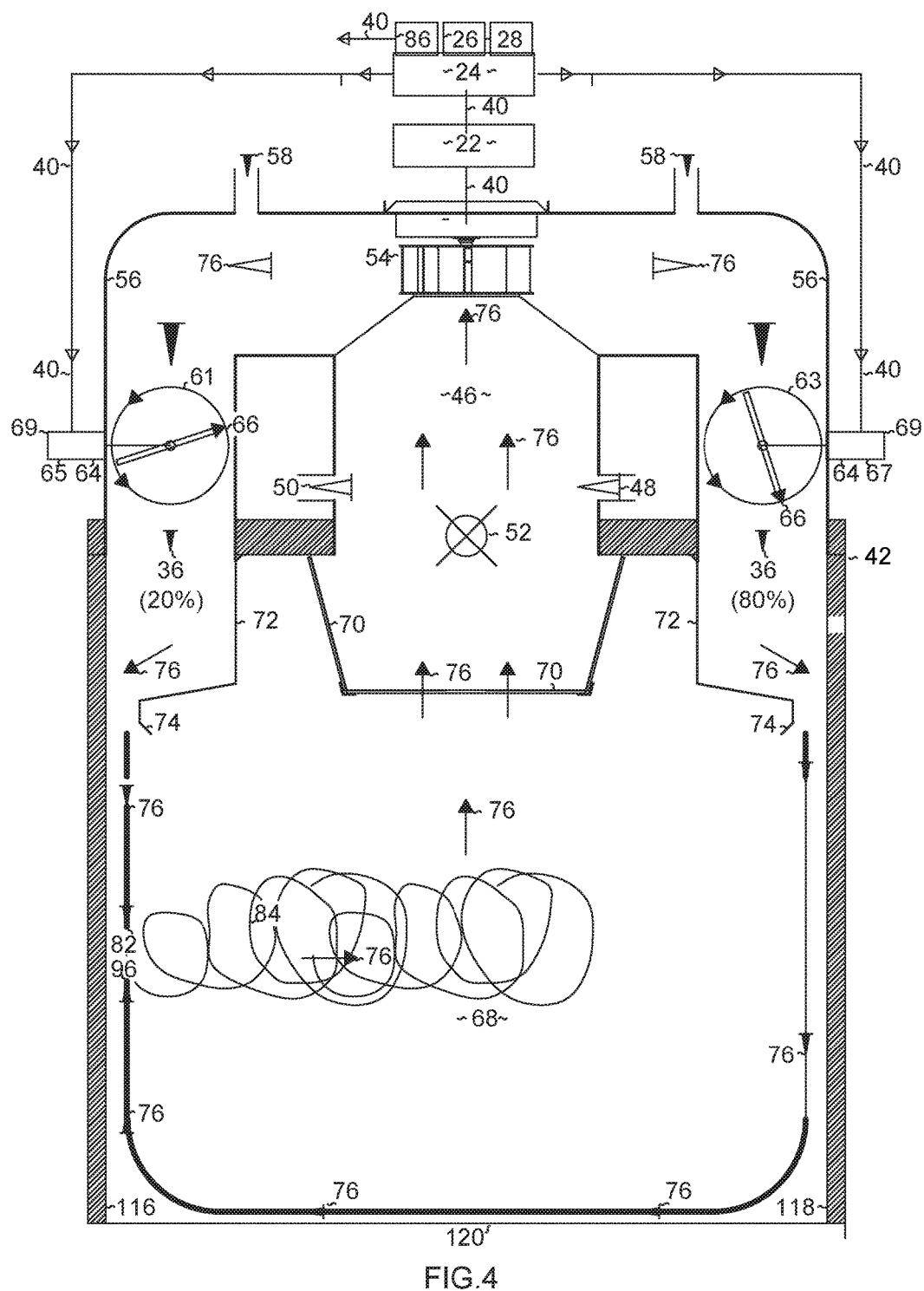
Figure 5:
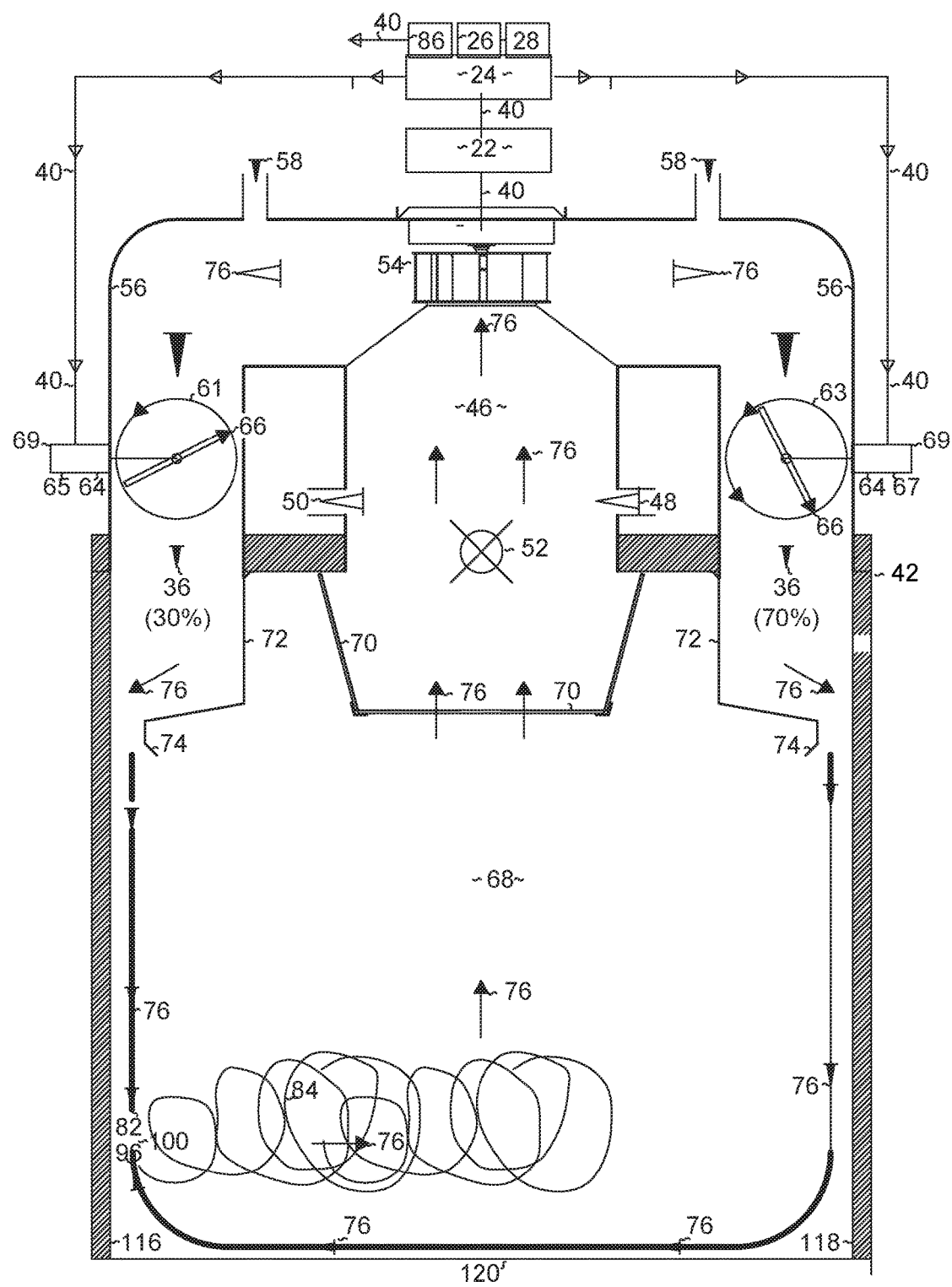

After an allotted amount of time has elapsed (the dwell time 96), the PLC 24 directs the damper actuators (servos) 64 to reposition the damper blades 88 by releasing the servo brakes 69. The first damper 61 is then moved 38 to its programmed 28 position #2 at approximately 63° from 0° (30% open), and the second damper 63 is moved 38 to its programmed 28 position #6 at approximately 153° from 0° (70% open). This repositions the convergence or break point 34 from a first breakpoint location (98, FIG. 3) to a second breakpoint location 100 (FIG. 5) on a left side 116 of the enclosure 68, wherein the two servo brakes 69 are applied. The amount of time 38 the system takes to transit between breakpoint 34 locations is controlled by the PLC and is chosen to uniformly cover the product 14. See FIGS. 3, 4, and 5 depicting the transition.

After an allotted amount of time has elapsed (the dwell time 96), the PLC 24 directs the damper actuators (servos) 64 to reposition the damper blades 88 by releasing the servo brakes 69. The first damper 61 is then moved 38 back to its programmed 28 position #1 at approximately 81° degrees from 0° (10% open), and the second damper 63 is moved back to its programmed 28 position #5 at approximately 171° from 0° (90% open). This moves the convergence or break point 34 from the second breakpoint location (100, FIG. 5) back to the first breakpoint location 98 (FIG. 3) on a left side 116 of the enclosure 68, wherein the two servo brakes 69 are applied. The amount of time 38 the system takes to transit between breakpoint 34 locations is controlled by the PLC and is chosen to uniformly cover the product 14. See FIGS. 3, 4, and 5 depicting the transitions.

This cyclical process between the first and second breakpoints may be repeated a number of times 32 before proceeding to the next step. In one form of the invention, this process is repeated five or more time before transitioning the breakpoint location to the other sidewall 118 of the oven and the repeat count is controlled by the PLC 24 in conjunction with the optional sensor readings taken from within the oven.

Figure 6:
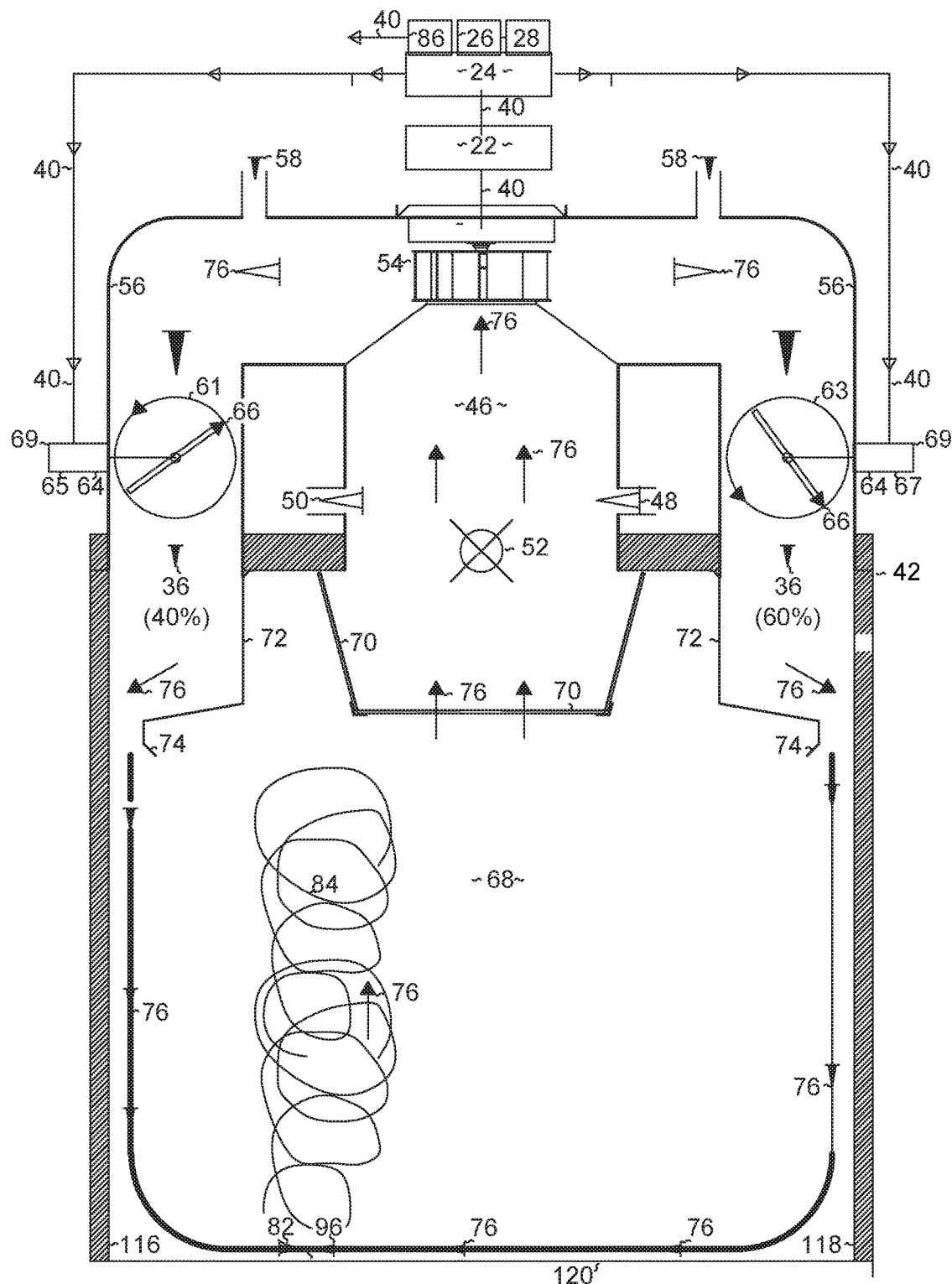
FIG. 6 shows a profile view of the oven with the left damper open (40%) and the right damper open (60%), positioning the breakpoint to create a vertical airflow at the lower left bottom 120 of the oven 68.
Figure 7:
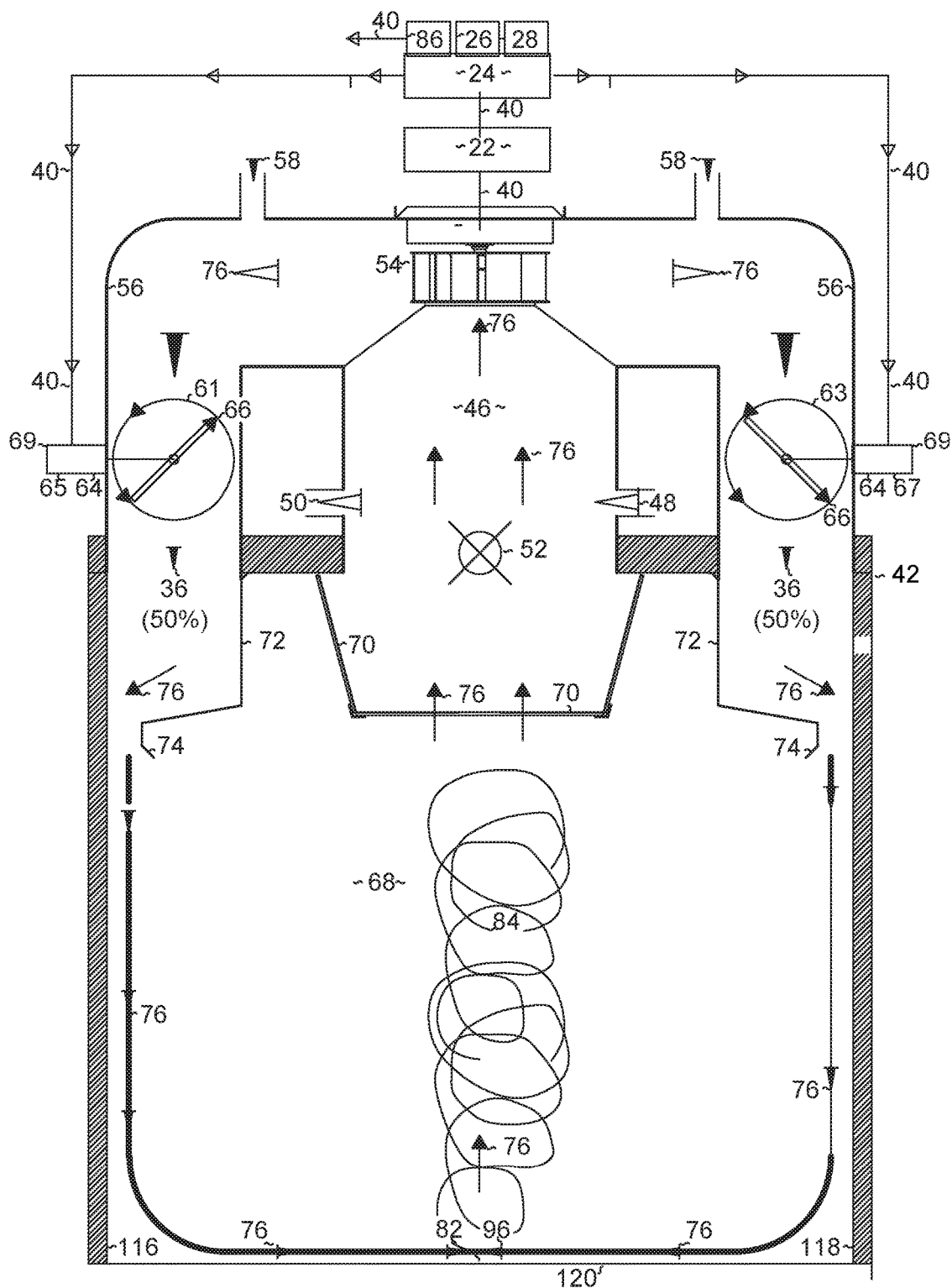
FIG. 7 shows a profile view of the oven with the left damper open (50%) to the same amount as the right damper (50%), positioning the breakpoint to create a vertical airflow at the center of the bottom 120 of the oven 68.
Figure 8:
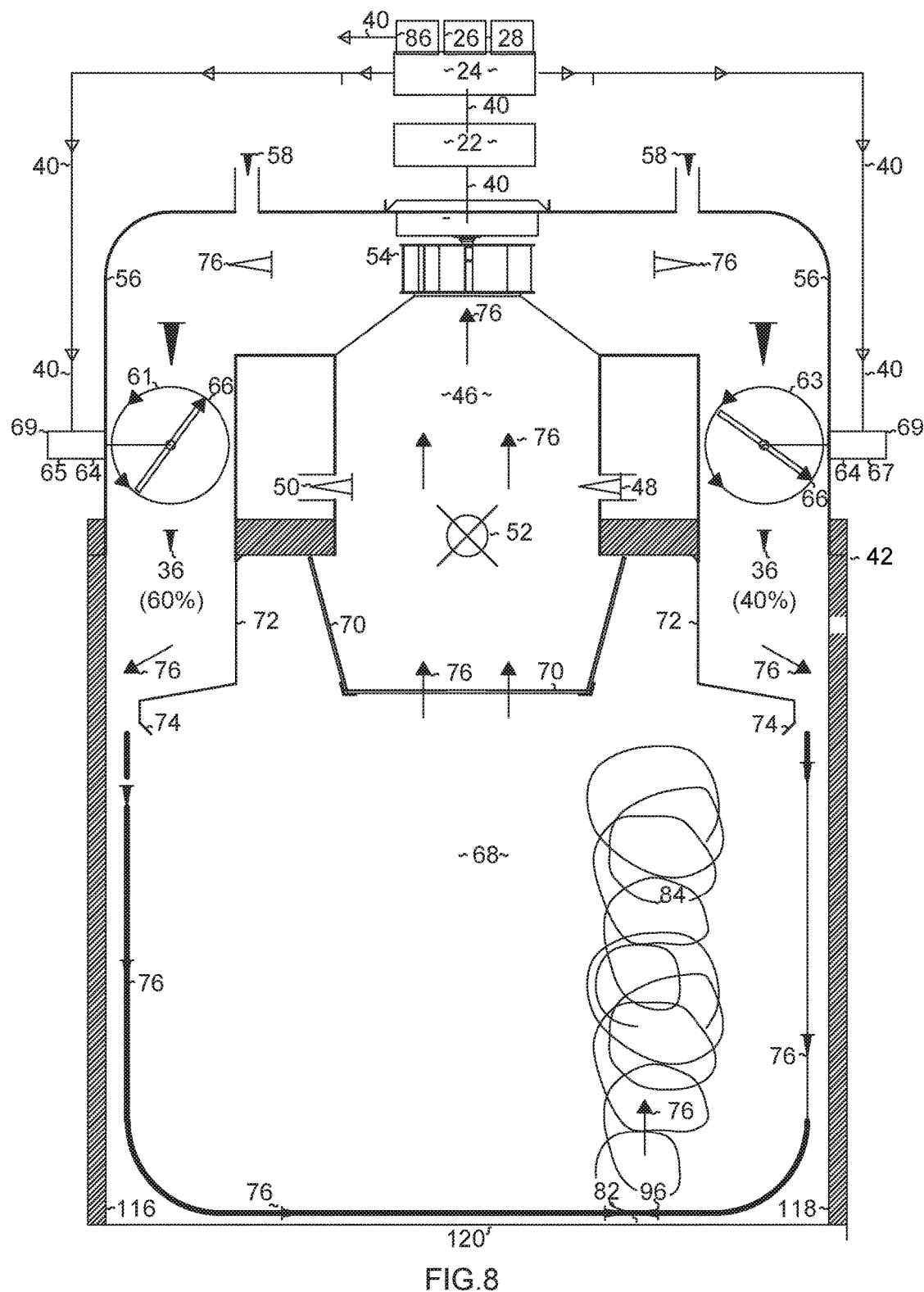
FIG. 8 shows a profile view of the oven with the left damper open (60%) and the right damper open (40%), positioning the breakpoint to create a vertical airflow at the lower right bottom 120 of the oven 68.

After the set number of repetitions 32 on the first side of the oven 116 are accomplished according to the cycle counter in the PLC or HMI and the dwell is completed on the preceding step, the servo brakes 69 are again released. The first damper 61 is rapidly 38 moved to its programmed position #3 at approximately 27° from 0° (70% open), and the second damper 63 is rapidly 38 moved to its programmed position #7 at approximately 117° from 0° (30% open) wherein the two servo brakes 69 are applied. This transitions the breakpoint from position #1 or #2, to breakpoint position #3 (102, FIG. 9) on the opposite sidewall 118 of the oven. In this embodiment, the transition occurs rapidly 38 to minimize the time the break point is on the floor 120 of the oven. See FIGS. 6, 7, 8 for the rapid transition of the breakpoint along the floor 120 of the oven.

After an allotted amount of time has elapsed (the dwell time 96), the PLC 24 directs the damper actuators (servos) 64 to reposition the damper blades 88 by releasing the servo brakes 69. The first damper 61 is then moved 38 to its programmed 28 position #4 at approximately 9° from 0° (90% open), and the second damper 63 is moved to its programmed 28 position #8 at approximately 99° from 0° (10% open). This moves the convergence or break point 34 from the third breakpoint location (102, FIG. 9) to a fourth breakpoint location 104 (FIG. 11) on a right side 118 of the enclosure 68, wherein the two servo brakes 69 are applied. The amount of time 38 the system takes to transit between breakpoint 34 locations is controlled by the PLC and is chosen to uniformly cover the product 14. See FIGS. 9, 10, and 11 depicting the transitions.

After an allotted amount of time has elapsed (the dwell time 96), the PLC 24 directs the damper actuators (servos) 64 to reposition the damper blades 88 by releasing the servo brakes 69. The first damper 61 then transitions 38 back to its programmed 28 position #3, and the second damper 63 transitions 38 back to its programmed 28 position #7, returning the breakpoint 34 from the fourth position to third breakpoint location (102, FIG. 9) wherein the two servo brakes 69 are applied. After a set time, by releasing the servo brakes 69, the first damper 61 then transitions back 38 to its programmed 28 position #4, and the second damper 63 transitions back 38 to its programmed position 28 #8, returning the breakpoint 34 to the forth breakpoint location (104, FIG. 11) wherein the two servo brakes 69 are applied. This cyclical process may be repeated a number of times 32 before proceeding to the next step.

In one form of the invention, this process is repeated five or more time before rapidly transitioning the breakpoint location to the other sidewall 116 of the oven (breakpoint position #1 or #2) wherein the left and right cycles may be repeated until the product 14 is fully processed according to the PLC's program parameters (such as products temperature, water content, or time).

The above descriptions of the invention including the exemplary embodiment described above are considered that of the preferred embodiments only. Modifications to the invention will occur to those skilled in the art and those who make use of the invention. Therefore, it is understood that the embodiments shown in the drawings and the examples set forth herein are described merely for illustrative purposes, and are not intended to limit the scope of the invention as interpreted according to the principles of patent law, including the doctrine of equivalents.

| REFERENCE NUMERALS SHOWN IN THE DRAWINGS | |
| --- | --- |
| 12 Product preparation area. | 14 Typical product |
| 16 Product carriers, racks or conveyors | 18 Carrier with vertical product |
| 20 Carrier with horizontal product | 22 Oven control panel (PLC) |
| 24 Damper's Control Panel (PLC) | 26 Manipulation Panel (HMI) |
| 28 HMI Programming | 30 HMI Program Patterns |
| 32 HMI Pattern Cycles | 34 Breakpoint Positions |
| 36 Airflow % Left and Right position | 38 Airflow speed to position |
| 40 Control wiring and signals | 42 External Oven cabinet |
| 44 HVAC Equipment | 46 External airflow return ductwork |
| 48 External fresh air supply to oven | 50 External Exhaust air from oven |
| 52 Airflow Heating source | 54 Main airflow recirculation fan |
| 56 External airflow supply ductwork | 58 Steam supply to oven for humidity |
| 59 Modulating Damper Actuator | 60 Rotating dampers |
| 61 First Damper | 62 Modulating dampers |
| 63 Second Damper 6 | 64 Damper actuators |
| 65 1st. Servo | 66 Damper position in degrees |
| 67 $2^{nd}$. Servo | 68 Internal Oven Cabinet |
| 69 Damper Brake | 70 Internal airflow return duct -work |
| 72 Internal airflow supply duct -work | 74 Internal airflow entrance areas |
| 76 Airflow direction | 78 Top area above product |
| 80 Bottom area below product | 82 Breakpoint position in oven |
| 84 Turbulent airflow | 86 Remote access industrial router |
| 88 Damper Blades | 89 Modified Damper Blade |
| 90 Damper shaft | 92 Forward moving airflow |
| 94 Backward moving airflow | 96 Dwell |
| 98 First breakpoint | 100 Second breakpoint |
| 102 Third breakpoint | 104 Fourth breakpoint |
| 116 Left side of oven enclosure | 118 Right side of oven enclosure |
| 120 Floor of oven enclosure | 122 Internal Plenum |
| 123 Split airflow | 124 Counter Clockwise to open |
| 125 Clockwise to open | |

The invention claimed is:

1. A method for controlling a resultant air stream within an oven comprising the steps of:
providing an enclosure;
providing a programmable Logic Controller (PLC);
storing a dwell time parameter in a program loaded into said PLC;
providing a heat source which provides treated air to said enclosure;
providing a main recirculation fan;
using said main recirculation fan to move said treated air;
dividing said treated air into at least a first airstream and a second airstream using a modulating damper capable of being positioned between a first position and a second position;
providing a first air discharge orifice directing said first airstream into the enclosure;
providing a second air discharge orifice directing said second airstream into the enclosure;
positioning said modulating damper to said first position;
causing said first airstream exiting said first air discharge orifice to converge with said second airstream exiting said second air discharge orifice at a first breakpoint location creating a combined turbulent third airflow which originates on a first side of said enclosure and proceeds in a turbulent form to at least a center of said enclosure;
transitioning said modulating damper from said first position to said second position moving an airflow convergence location from said first breakpoint location to a second breakpoint location;
transitioning said modulating damper from said second position back to said first position returning said combined turbulent third airflow from said second breakpoint location to said first breakpoint location; and
holding said combined turbulent third airflow at either said first breakpoint location or said second breakpoint location for a length of time controlled by said dwell time parameter.

2. The method as defined in claim 1 wherein said first breakpoint location and said second breakpoint location are both located on a first side of said enclosure and wherein said combined turbulent third airflow is transitioned between said first breakpoint location and said second breakpoint location two or more times consecutively.

3. A method for controlling a resultant air stream within an oven comprising the steps of:
providing an enclosure;
providing a programmable Logic Controller (PLC);
storing a dwell time parameter in a program loaded into said PLC;
providing a heat source which provides treated air to said enclosure;
providing a main recirculation fan;
using said main recirculation fan to move said treated air;
dividing said treated air into at least a first airstream and a second airstream;
providing a first air discharge orifice directing said first airstream into the enclosure;
providing a second air discharge orifice directing said second airstream into the enclosure;
providing a first variable damper limiting said first airstream, said first variable damper capable of being positioned between a first position and a second position;
providing a second variable damper limiting said second airstream, said second variable damper capable of being positioned between a third position and a fourth position;
positioning said first variable damper to said first position and positioning said second variable damper to said third position;
causing said first airstream exiting said first air discharge orifice to converge with said second airstream exiting said second air discharge orifice at a first breakpoint location creating a combined turbulent third airflow which originates on a first side of said enclosure and proceeds in a turbulent form to at least a center of said enclosure;
transitioning said first variable damper from said first position to said second position and transitioning said second variable damper from said third position to said fourth position moving an airflow convergence location from said first breakpoint location to a second breakpoint location creating a combined turbulent third airflow proceeding in a turbulent form to at least the center of said enclosure;
transitioning said first variable damper from said second position back to said first position and transitioning said second variable damper from said fourth position to said third position returning said combined turbulent third airflow from said second breakpoint location to said first breakpoint location; and holding said combined turbulent third airflow at either said first breakpoint location or said second breakpoint location for a length of time controlled by said dwell time parameter.

4. The method as defined in claim 3 wherein said combined turbulent third airflow is oriented in horizontal direction.

5. The method as defined in claim 3 wherein said combined turbulent third airflow is oriented in a vertical direction.

6. The method as defined in claim 3 wherein said first breakpoint location and said second breakpoint locations are both located on a first sidewall of said enclosure; and
and wherein said combined turbulent airflow is transitioned between said first breakpoint location and said second breakpoint location two or more times consecutively.

7. The method as defined in claim 3, further comprising the steps of:
providing a first servo motor attached to and controlling position of said first variable damper;
providing a second servo motor attached to and controlling position of said second variable damper;
positioning said first servo motor according to signals delivered by said PLC; and
positioning said second servo motor according to signals delivered by said PLC.

8. The method as defined in claim 6, further comprising the steps of:
providing a first servo motor attached to and controlling position of said first variable damper;
providing a second servo motor attached to and controlling position of said second variable damper;
positioning said first servo motor according to signals delivered by said PLC;
positioning said second servo motor according to signals delivered by said PLC; and
controlling the speed of said main recirculation fan to ensure said combined third turbulent airflow remains turbulent to at least the center of said enclosure.

9. The method as defined in claim 3, further including the steps of:
storing a movement time parameter in a program loaded into said PLC; and
moving said combined turbulent third airflow between said first breakpoint location and said second breakpoint location over a length of time according to stored movement time parameter.

10. The method as defined in claim 6 further including the steps of:
transitioning said first variable damper into a fifth position and transitioning said second variable damper into a sixth position causing said first airstream exiting said first air discharge orifice to converge with said second airstream exiting said second air discharge orifice at a third breakpoint located on a second sidewall of the enclosure wherein said combined turbulent third airflow proceeds in a turbulent form to at least the center of said enclosure;
transitioning said first variable damper from said fifth position to a seventh position and transitioning said second variable damper from said sixth position to an eighth position moving the convergence location from said third breakpoint location to a fourth breakpoint location located on said second sidewall of the enclosure wherein said combined turbulent third airflow proceeds in a turbulent form at least the center of said enclosure; and
transitioning said first variable damper from said seventh position back to said fifth position and transitioning said second variable damper from said eighth position back to said sixth position returning said fourth breakpoint location to said third breakpoint.

11. The method as defined in claim 10,
wherein the step of moving said combined turbulent third airflow between said third breakpoint location and said fourth breakpoint location repeats two or more times consecutively during the cooking of a product placed into said enclosure.

12. The method as defined in claim 10, further comprising the steps of:
providing a first servo motor attached to and controlling position of said first variable damper;
providing a second servo motor attached to and controlling position of said second variable damper;
positioning said first servo motor according to signals delivered by said PLC; and
positioning said second servo motor according to signals delivered by said PLC.

13. The method as defined in claim 12, further comprising the steps:
providing a human to machine interface (HMI); and
displaying current positions of said first variable damper and said second variable damper on a display of said HMI.

14. The method as defined in claim 12, further comprising the steps of:
providing a first brake arresting the position of said first servo motor when engaged;
providing a second brake arresting the position of said first servo motor when engaged;
engaging said first brake and said second brake at the direction of said PLC.

15. A method for controlling a resultant air stream within an oven comprising the steps of:
providing an enclosure;
providing a heat source which provides treated air to said enclosure;
providing a main recirculation fan;
using said main recirculation fan to move said treated air;
dividing said moving treated air into at least a first airstream and a second airstream;
providing a first air discharge orifice directing said first airstream into the enclosure;
providing a second air discharge orifice directing said second airstream into the enclosure;
providing a first variable damper limiting said first airstream, said first variable damper capable of being positioned between a first position, a second position, a third position, and a fourth position;
providing a second variable damper limiting said second airstream, said second variable damper capable of being positioned between a fifth position, a sixth position, a seventh position, and an eighth position;
positioning said first variable damper to said first position and positioning said second variable damper to said fifth position;
causing said first airstream exiting said first air discharge orifice to converge with said second airstream exiting said second air discharge orifice at a first breakpoint location on a first side of an enclosure creating a combined turbulent third airflow which proceeds in a turbulent form to at least a center of said enclosure;

transitioning said first variable damper from said first position to said second position and transitioning said second variable damper from said fifth position to said sixth position moving an airflow convergence location from said first breakpoint location to a second breakpoint location also located on said first side of an enclosure, and wherein said combined turbulent third airflow proceeds in a turbulent form from said second breakpoint location to at least the center of said enclosure;

transitioning said first variable damper from said second position back to said first position and transitioning said second variable damper from said sixth position to said fifth position returning said second breakpoint location to said first breakpoint location;

repeating a first transition between said first breakpoint and said second breakpoint two or more times consecutively;

transitioning said first variable damper into a third position and transitioning said second variable damper into a seventh position causing said first airstream exiting said first air discharge orifice to converge with said second airstream exiting said second air discharge orifice at a third breakpoint located on a second side of the enclosure, and wherein said combined turbulent third airflow proceeds in a turbulent form from said third breakpoint location to at least the center of said enclosure;

transitioning said first variable damper from said third position to fourth position and transitioning said second variable damper from said seventh position to said eighth position moving the airflow convergence location from said third breakpoint location to a fourth breakpoint location located on said second side of the enclosure, and wherein said combined turbulent third airflow proceeds in a turbulent form from said fourth breakpoint location to at least the center of said enclosure;

transitioning said first variable damper from said fourth position back to said third position and transitioning said second variable damper from said eighth position back to said seventh position returning said fourth breakpoint location to said third breakpoint location; and repeating a second transition between said third breakpoint and said fourth breakpoints two or more times consecutively.

16. The method as defined in claim 15, further comprising the steps of:
providing a programmable Logic Controller (PLC);
providing a first servo motor attached to and controlling position of said first variable damper;
providing a second servo motor attached to and controlling position of said second variable damper;
positioning said first servo motor according to signals delivered by said PLC;
positioning said second servo motor according to signals delivered by said PLC; and
controlling the speed of said a main recirculation fan to ensure said combined turbulent third airflow remains turbulent to at least the center of said enclosure.

17. The method as defined in claim 15 wherein the step of transitioning said first variable damper between said second position and said third position and the step of transitioning said second variable damper between said sixth position and said seventh position are completed as rapidly as possible to minimize a time length that the first airflow and the second airflow converge on a floor of said enclosure.

18. The method as defined in claim 16, further including the steps of:
storing a dwell time parameter in a program loaded into said PLC; and
holding said combined turbulent third airflow at either said first breakpoint or said second breakpoint for a length of time controlled by said dwell time parameter.

19. The method as defined in claim 15, further comprising the steps of:
providing a central plenum within said enclosure; and
using said central plenum to guide a return airflow to said main recirculation fan.

20. The method as defined in claim 15, wherein at least one of said first variable damper or said second variable damper rotate about a pivot located adjacent to a wall of an airduct.

21. A method for controlling a resultant air stream within an oven comprising the steps of:
providing an enclosure;
providing a heat source which provides treated air to said enclosure;
providing a Programmable Logic Controller (PLC) programmed with a cycle counter and a dwell time parameter;
providing a Human to Machine Interface (HMI) in communication with said PLC;
providing a non-overloading main recirculation fan;
providing a Variable Frequency Drive (VFD) motor which drives said non-overloading main recirculation fan according to an input from the PLC;
using said non-overloading main recirculation fan to move said treated air;
dividing said treated air into at least a first airstream and a second airstream;
providing a first air discharge orifice directing said first airstream into the enclosure;
providing a second air discharge orifice directing said second airstream into the enclosure;
providing a first variable damper limiting said first airstream, said first variable damper capable of being positioned into at least four positions, including a first position, a second position, a third position, and a fourth position;
providing a second variable damper limiting said second airstream, said second variable damper capable of being positioned into at least four positions, including a fifth position, a sixth position, a seventh position, and an eighth position;
providing a first servo motor attached to and controlling position of said first variable damper;
providing a second servo motor attached to and controlling position of said second variable damper;
providing a first brake arresting a position of said first servo motor, said first brake engaged when said first servo motor is not being directed to a new position;
providing a second brake arresting a position of said second servo motor, said second brake engaged when said second servo motor is not being directed to a new position;
using said first servo motor to place said first variable damper into said first position and using said second servo motor to transition said second variable damper into said fifth position;

causing said first airstream exiting said first air discharge orifice to converge with said second airstream exiting said second air discharge orifice at a first breakpoint location on a first side of the enclosure creating a combined turbulent third airflow extending perpendicular to said first side and which remains turbulent to at least a center of said enclosure;

using said first servo motor to transition said first variable damper from said first position to said second position and using said second servo motor to transition said second variable damper from said fifth position to said sixth position thereby moving an airflow convergence location from said first breakpoint location to a second breakpoint location also located on said first side of said enclosure, and wherein said combined turbulent third airflow proceeds in a turbulent form from said second breakpoint location to at least the center of said enclosure;

using said first servo motor to transition said first variable damper from said second position back to said first position and using said second servo motor to transition said second variable damper from said sixth position to said fifth position returning said second breakpoint location to said first breakpoint location;

using said first servo motor to transition said first variable damper to said third position and using said second servo motor to transition said second variable damper into a seventh position causing said first airstream exiting said first air discharge orifice to converge with said second airstream exiting said second air discharge orifice at a third breakpoint located on a second opposite sidewall of the enclosure, and wherein said combined turbulent third airflow proceeds in a turbulent form from said third breakpoint location to at least the center of said enclosure;

using said first servo motor to transition said first variable damper from said third position to said fourth position and using said second servo motor to transition said second variable damper from said seventh position to said eighth position moving the airflow convergence location from said third breakpoint location to a fourth breakpoint location located on said second opposite sidewall of the enclosure, and wherein said combined turbulent third airflow proceeds in a turbulent form from said fourth breakpoint location to at least the center of said enclosure;

using said first servo motor to transition said first variable damper from said fourth position back to said third position and using said second servo motor to transition said second variable damper from said eighth position back to said seventh position returning said fourth breakpoint location to said third breakpoint location;

positioning said first servo motor according to signals delivered by said PLC;

positioning said second servo motor according to signals delivered by said PLC;

controlling a speed of said Variable Frequency Drive (VFD) motor via signals from said PLC to ensure said combined turbulent third airflow remains turbulent to the center of said enclosure;

displaying current positions of said first variable damper and said second variable damper on a display of said HMI; and holding said combined turbulent third airflow at one of said first breakpoint, said second breakpoint, said third breakpoint, or said fourth breakpoint for a length of time controlled by said dwell time parameter.

22. The method as defined in claim 2, further comprising the steps of:
providing a programmable Logic Controller (PLC);
providing a first servo motor attached to and controlling position of said first variable damper; and
positioning said first servo motor according to signals delivered by said PLC.

23. The method as defined in claim 15, further comprising the steps of:
providing a programmable Logic Controller (PLC);
providing a first servo motor attached to and controlling position of said first variable damper;
providing a second servo motor attached to and controlling position of said second variable damper;
positioning said first servo motor according to signals delivered by said PLC;
positioning said second servo motor according to signals delivered by said PLC; and
controlling the positioning of said first variable damper and said second variable damper to alter the airspeed of said turbulent third airflow without changing the position of said combined turbulent third airflow.

24. The method as defined in claim 20, further comprising the step of directing airflow toward at least one of said first air discharge orifice or said second air discharge orifice using said damper containing a pivot point located adjacent to a wall of an airduct, thereby reducing the turbulence of the air entering at least one of said first air discharge orifice or said second air discharge orifice.

* * * * *